(12) United States Patent
Hazzard et al.

(10) Patent No.: US 11,592,852 B2
(45) Date of Patent: Feb. 28, 2023

(54) SYSTEM FOR COMMUNICATION, OPTIMIZATION AND DEMAND CONTROL FOR AN APPLIANCE

(71) Applicant: Honeywell International Inc., Morris Plains, NJ (US)

(72) Inventors: Frederick Hazzard, Plymouth, MN (US); David Heil, Robbinsdale, MN (US); Ravindra Khosla, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 403 days.

(21) Appl. No.: 15/828,054

(22) Filed: Nov. 30, 2017

(65) Prior Publication Data

US 2018/0088611 A1 Mar. 29, 2018

Related U.S. Application Data

(63) Continuation of application No. 14/225,308, filed on Mar. 25, 2014, now abandoned.

(51) Int. Cl.
*F24D 19/10* (2006.01)
*F24H 9/20* (2022.01)
(Continued)

(52) U.S. Cl.
CPC ......... *G05D 23/30* (2013.01); *F24D 19/1063* (2013.01); *F24H 9/2007* (2013.01); *G05D 23/1904* (2013.01)

(58) Field of Classification Search
CPC .. G05D 23/1904; G05D 23/30; F24H 9/2007; F24H 19/1063; F24D 19/1063
See application file for complete search history.

(56) References Cited

U.S. PATENT DOCUMENTS 2,331,718 A 10/1943 Newton
2,920,126 A 1/1960 Hajny
(Continued)

FOREIGN PATENT DOCUMENTS

CA 2158120 A1 3/1997
CN 201772614 U 3/2011
(Continued)

OTHER PUBLICATIONS

"Results and Methodology of the Engineering Analysis for Residential Water Heater Efficiency Standards," 101 pages, Oct. 1998.
(Continued)

*Primary Examiner* — Jennifer L Norton
(74) *Attorney, Agent, or Firm* — Shumaker & Sieffert, P.A.

(57) ABSTRACT

A system and approach for developing a periodic water usage profile and demand for controlling a water heater. A mode may be selected for demand for a certain amount of water of a particular temperature range to be available for use from the water heater. Data on hot water usage may be collected and the usage profile and demand may be calculated from the data. The water heater may be programmed to operate in a certain fashion based on the usage profile and demand. A control knob may be on the water heater control to select a particular demand. Control of the water heater may be operated from a remote device connected in a wireless or wired fashion. An optimization program may be implemented in the control of the water heater for achieving one or more beneficial goals related to water heater performance and hot water production.

13 Claims, 29 Drawing Sheets

(51) Int. Cl.
  *G05D 23/19* (2006.01)
  *G05D 23/30* (2006.01)

(56) References Cited

U.S. PATENT DOCUMENTS

| | | |
|---|---|---|
| 3,272,432 A | 9/1966 | Davidson |
| 3,759,279 A | 9/1973 | Smith, Jr. |
| 3,833,428 A | 9/1974 | Snyder et al. |
| 3,847,350 A | 11/1974 | Thompson |
| 3,849,350 A | 11/1974 | Matsko |
| 3,909,816 A | 9/1975 | Teeters |
| 3,948,439 A | 4/1976 | Heeger |
| 4,127,380 A | 11/1978 | Straitz, III |
| 4,131,413 A | 12/1978 | Ryno |
| 4,221,557 A | 9/1980 | Jalics |
| 4,305,547 A | 12/1981 | Cohen |
| 4,324,207 A | 4/1982 | Leuthard |
| 4,324,944 A | 4/1982 | Weihrich et al. |
| RE30,936 E | 5/1982 | Kmetz et al. |
| 4,333,002 A | 6/1982 | Kozak |
| 4,421,062 A | 12/1983 | Padilla, Sr. |
| 4,438,728 A | 3/1984 | Fracaro |
| 4,467,178 A | 8/1984 | Swindle |
| 4,483,672 A | 11/1984 | Wallace et al. |
| 4,507,938 A | 4/1985 | Hama et al. |
| 4,508,261 A | 4/1985 | Blank |
| 4,511,790 A | 4/1985 | Kozak |
| 4,568,821 A | 2/1986 | Boe |
| 4,588,875 A | 5/1986 | Kozak et al. |
| 4,638,789 A | 1/1987 | Ueki et al. |
| 4,655,705 A | 4/1987 | Shute et al. |
| 4,692,598 A | 9/1987 | Yoshida et al. |
| 4,696,639 A | 9/1987 | Bohan, Jr. |
| 4,734,658 A | 3/1988 | Bohan, Jr. |
| 4,742,210 A | 5/1988 | Tsuchiyama et al. |
| 4,770,629 A | 9/1988 | Bohan, Jr. |
| 4,778,378 A | 10/1988 | Dolnick et al. |
| 4,830,601 A | 5/1989 | Dahlander et al. |
| 4,834,284 A | 5/1989 | Vandermeyden |
| 4,906,337 A | 3/1990 | Palmer |
| 4,965,232 A | 10/1990 | Mauleon et al. |
| 4,977,885 A | 12/1990 | Herweyer et al. |
| 4,984,981 A | 1/1991 | Pottebaum |
| 4,986,468 A | 1/1991 | Deisinger |
| 5,007,156 A | 4/1991 | Hurtgen |
| 5,037,291 A | 8/1991 | Clark |
| 5,077,550 A | 12/1991 | Cormier |
| 5,103,078 A | 4/1992 | Boykin et al. |
| 5,112,217 A | 5/1992 | Ripka et al. |
| 5,125,068 A | 6/1992 | McNair et al. |
| 5,126,721 A | 6/1992 | Butcher et al. |
| 5,222,888 A | 6/1993 | Jones et al. |
| 5,232,582 A | 8/1993 | Takahashi et al. |
| 5,236,328 A | 8/1993 | Tate et al. |
| 5,280,802 A | 1/1994 | Comuzie, Jr. |
| 5,317,670 A | 5/1994 | Elia |
| 5,391,074 A | 2/1995 | Meeker |
| 5,424,554 A | 6/1995 | Marran et al. |
| 5,442,157 A | 8/1995 | Jackson |
| 5,567,143 A | 10/1996 | Servidio |
| 5,622,200 A | 4/1997 | Schulze |
| 5,660,328 A | 8/1997 | Momber |
| 5,779,143 A | 7/1998 | Michaud et al. |
| 5,791,890 A | 8/1998 | Maughan |
| 5,797,358 A | 8/1998 | Brandt et al. |
| 5,857,845 A | 1/1999 | Paciorek |
| 5,896,089 A | 4/1999 | Bowles |
| 5,968,393 A | 10/1999 | Demaline |
| 5,971,745 A | 10/1999 | Bassett et al. |
| 5,975,884 A | 11/1999 | Dugger |
| 6,053,130 A | 4/2000 | Shellenberger |
| 6,059,195 A | 5/2000 | Adams et al. |
| 6,069,998 A | 5/2000 | Barnes et al. |
| 6,075,923 A | 6/2000 | Wu |
| 6,080,971 A | 6/2000 | Seitz et al. |
| 6,208,806 B1 | 3/2001 | Langford |
| 6,212,894 B1 | 4/2001 | Brown et al. |
| 6,236,321 B1 | 5/2001 | Troost, IV |
| 6,261,087 B1 | 7/2001 | Bird et al. |
| 6,271,505 B1 | 8/2001 | Henderson |
| 6,286,464 B1 | 9/2001 | Abraham et al. |
| 6,293,471 B1 | 9/2001 | Stettin et al. |
| 6,299,433 B1 | 10/2001 | Gauba et al. |
| 6,350,967 B1 | 2/2002 | Scott |
| 6,351,603 B2 | 2/2002 | Waithe et al. |
| 6,363,218 B1 | 3/2002 | Lowenstein et al. |
| 6,371,057 B1 | 4/2002 | Henderson |
| 6,375,087 B1 | 4/2002 | Day et al. |
| 6,390,029 B2 | 5/2002 | Alphs |
| RE37,745 E | 6/2002 | Brandt et al. |
| 6,410,842 B1 | 6/2002 | McAlonan |
| 6,455,820 B2 | 9/2002 | Bradenbaugh |
| 6,553,946 B1 | 4/2003 | Abraham et al. |
| 6,560,409 B2 | 5/2003 | Troost, IV |
| 6,606,968 B2 | 8/2003 | Iwama et al. |
| 6,629,021 B2 | 9/2003 | Cline et al. |
| 6,631,622 B1 | 10/2003 | Ghent et al. |
| 6,633,726 B2 | 10/2003 | Bradenbaugh |
| 6,684,821 B2 | 2/2004 | Lannes et al. |
| 6,701,874 B1 | 3/2004 | Schultz et al. |
| 6,732,677 B2 | 5/2004 | Donnelly et al. |
| 6,794,771 B2 | 9/2004 | Orloff |
| 6,795,644 B2 | 9/2004 | Bradenbaugh |
| 6,835,307 B2 | 12/2004 | Talbert et al. |
| 6,845,110 B2 | 1/2005 | Gibson |
| 6,861,621 B2 | 3/2005 | Ghent |
| 6,880,493 B2 | 4/2005 | Clifford |
| 6,920,377 B2 | 7/2005 | Chian |
| 6,934,862 B2 | 8/2005 | Sharood et al. |
| 6,936,798 B2 | 8/2005 | Moreno |
| 6,955,301 B2 | 10/2005 | Munsterhuis et al. |
| 6,959,876 B2 | 11/2005 | Chian et al. |
| 6,967,565 B2 | 11/2005 | Lingemann |
| 6,973,819 B2 | 12/2005 | Ruhland et al. |
| 6,995,301 B1 | 2/2006 | Shorrosh |
| 7,032,542 B2 | 4/2006 | Donnelly et al. |
| 7,065,431 B2 | 6/2006 | Patterson et al. |
| 7,076,373 B1 | 7/2006 | Munsterhuis et al. |
| 7,088,238 B2 | 8/2006 | Karaoguz et al. |
| 7,103,272 B2 | 9/2006 | Baxter |
| 7,117,825 B2 | 10/2006 | Phillips |
| 7,137,373 B2 | 11/2006 | Seymour, II et al. |
| 7,162,150 B1 | 1/2007 | Welch et al. |
| 7,167,813 B2 | 1/2007 | Chian et al. |
| 7,221,862 B1 | 5/2007 | Miller et al. |
| 7,252,502 B2 | 8/2007 | Munsterhuis |
| 7,255,285 B2 | 8/2007 | Troost et al. |
| 7,298,968 B1 | 11/2007 | Boros et al. |
| 7,317,265 B2 | 1/2008 | Chian et al. |
| 7,346,274 B2 | 3/2008 | Bradenbaugh |
| 7,373,080 B2 | 5/2008 | Baxter |
| 7,380,522 B2 | 6/2008 | Krell et al. |
| 7,432,477 B2 | 10/2008 | Teti |
| 7,434,544 B2 | 10/2008 | Donnelly et al. |
| 7,469,550 B2 | 12/2008 | Chapman, Jr. et al. |
| 7,506,617 B2 | 3/2009 | Paine |
| 7,526,539 B1 | 4/2009 | Hsu |
| 7,561,057 B2 | 7/2009 | Kates |
| 7,603,204 B2 | 10/2009 | Patterson et al. |
| 7,613,855 B2 | 11/2009 | Phillips et al. |
| 7,623,771 B2 | 11/2009 | Lentz et al. |
| 7,634,976 B2 | 12/2009 | Gordon et al. |
| 7,672,751 B2 | 3/2010 | Patterson et al. |
| 7,712,677 B1 | 5/2010 | Munsterhuis et al. |
| 7,744,007 B2 | 6/2010 | Beagen et al. |
| 7,744,008 B2 | 6/2010 | Chapman, Jr. et al. |
| 7,770,807 B2 | 8/2010 | Robinson et al. |
| 7,798,107 B2 | 9/2010 | Chian et al. |
| 7,804,047 B2 | 9/2010 | Zak et al. |
| 7,902,959 B2 | 3/2011 | Yamada et al. |
| 7,932,480 B2 | 4/2011 | Gu et al. |
| 7,934,662 B1 | 5/2011 | Jenkins |
| 7,970,494 B2 | 6/2011 | Fima |
| 7,974,527 B1 | 7/2011 | Adler |

(56) References Cited

U.S. PATENT DOCUMENTS

| | | | |
|---|---|---|---|
| 8,061,308 B2 | 11/2011 | Phillips | |
| 8,074,894 B2 | 12/2011 | Beagen | |
| 8,083,104 B2 | 12/2011 | Roetker et al. | |
| 8,111,980 B2 | 2/2012 | Bradenbaugh | |
| 8,165,726 B2 | 4/2012 | Nordberg et al. | |
| 8,204,633 B2 | 6/2012 | Harbin, III et al. | |
| 8,245,987 B2 | 8/2012 | Hazzard et al. | |
| 8,322,312 B2 | 12/2012 | Strand | |
| 8,360,334 B2 | 1/2013 | Nold et al. | |
| 8,367,984 B2 | 2/2013 | Besore et al. | |
| 8,422,870 B2 | 4/2013 | Nelson et al. | |
| 8,485,138 B2 | 7/2013 | Leeland | |
| 8,498,527 B2 | 7/2013 | Roetker et al. | |
| 8,600,556 B2 | 12/2013 | Nesler et al. | |
| 8,606,092 B2 | 12/2013 | Amiran et al. | |
| 8,660,701 B2 | 2/2014 | Phillips et al. | |
| 8,667,112 B2 | 3/2014 | Roth et al. | |
| 8,726,789 B2 | 5/2014 | Clark | |
| 8,770,152 B2 | 7/2014 | Leeland et al. | |
| 9,080,769 B2 | 7/2015 | Bronson et al. | |
| 9,122,283 B2 | 9/2015 | Rylski et al. | |
| 9,195,242 B2 | 11/2015 | Zobrist et al. | |
| 9,228,746 B2 | 1/2016 | Hughes et al. | |
| 9,234,664 B1* | 1/2016 | Hayner | F24D 3/02 |
| 9,249,986 B2 | 2/2016 | Hazzard et al. | |
| 9,268,342 B2 | 2/2016 | Beyerle et al. | |
| 9,310,098 B2 | 4/2016 | Buescher et al. | |
| 9,702,568 B2* | 7/2017 | Miller | G05D 23/1904 |
| 9,702,590 B2* | 7/2017 | Wen | F24H 9/2007 |
| 9,784,472 B2* | 10/2017 | Stevens | F24D 19/1006 |
| 2002/0099474 A1 | 7/2002 | Khesin | |
| 2003/0091091 A1* | 5/2003 | Patterson | G05D 23/1951 |
| | | | 374/141 |
| 2003/0093186 A1 | 5/2003 | Patterson et al. | |
| 2004/0042772 A1 | 3/2004 | Whitford et al. | |
| 2004/0079749 A1 | 4/2004 | Young et al. | |
| 2005/0038566 A1 | 2/2005 | Chian | |
| 2006/0027571 A1 | 2/2006 | Miyoshi et al. | |
| 2006/0208099 A1 | 9/2006 | Chapman et al. | |
| 2006/0272830 A1 | 12/2006 | Fima | |
| 2007/0023333 A1 | 2/2007 | Mouhebaty et al. | |
| 2007/0133965 A1* | 6/2007 | Miller | F24H 9/2021 |
| | | | 392/498 |
| 2007/0210177 A1 | 9/2007 | Karasek | |
| 2007/0292810 A1 | 12/2007 | Maiello et al. | |
| 2008/0003530 A1 | 1/2008 | Donnelly et al. | |
| 2008/0023564 A1 | 1/2008 | Hall | |
| 2008/0048046 A1 | 2/2008 | Wagner et al. | |
| 2008/0188995 A1 | 8/2008 | Hotton et al. | |
| 2008/0197206 A1 | 8/2008 | Murakami et al. | |
| 2008/0314999 A1 | 12/2008 | Strand | |
| 2009/0101085 A1* | 4/2009 | Arensmeier | F23N 5/242 |
| | | | 122/14.22 |
| 2009/0117503 A1 | 5/2009 | Cain | |
| 2010/0065764 A1 | 3/2010 | Canpolat | |
| 2010/0095906 A1 | 4/2010 | Leeland et al. | |
| 2010/0163016 A1 | 7/2010 | Pan | |
| 2010/0187219 A1 | 7/2010 | Besore et al. | |
| 2010/0324962 A1 | 12/2010 | Nesler et al. | |
| 2011/0031323 A1 | 2/2011 | Nold et al. | |
| 2011/0044671 A1 | 2/2011 | Amiran et al. | |
| 2011/0123179 A1 | 5/2011 | Roetker et al. | |
| 2011/0254661 A1 | 10/2011 | Fawcett et al. | |
| 2011/0259322 A1 | 10/2011 | Davis et al. | |
| 2011/0305444 A1 | 12/2011 | Pussell | |
| 2012/0023212 A1 | 1/2012 | Roth et al. | |
| 2012/0060771 A1 | 3/2012 | Brian et al. | |
| 2012/0060829 A1 | 3/2012 | DuPlessis et al. | |
| 2012/0118989 A1 | 5/2012 | Buescher et al. | |
| 2012/0271465 A1 | 10/2012 | Zobrist et al. | |
| 2013/0104814 A1 | 5/2013 | Reyman | |
| 2013/0193221 A1 | 8/2013 | Buescher et al. | |
| 2014/0060457 A1 | 3/2014 | Hill et al. | |
| 2014/0175183 A1* | 6/2014 | Phillips | F24H 9/2014 |
| | | | 236/20 R |
| 2014/0202549 A1 | 7/2014 | Hazzard et al. | |
| 2014/0203093 A1 | 7/2014 | Young et al. | |
| 2014/0212821 A1 | 7/2014 | Banu et al. | |
| 2014/0312127 A1 | 10/2014 | Rylski et al. | |
| 2015/0083384 A1 | 3/2015 | Lewis, Jr. et al. | |
| 2015/0120067 A1 | 4/2015 | Wing et al. | |
| 2015/0127184 A1* | 5/2015 | Harbin, III | F24D 19/1051 |
| | | | 700/296 |
| 2015/0276265 A1* | 10/2015 | Davari | H04L 67/025 |
| | | | 700/300 |
| 2015/0276268 A1 | 10/2015 | Hazzard et al. | |
| 2015/0277463 A1 | 10/2015 | Hazzard et al. | |
| 2015/0354833 A1 | 12/2015 | Kreutzman | |
| 2016/0146505 A1* | 5/2016 | Hill | F24H 9/2021 |
| | | | 392/498 |
| 2016/0178234 A1* | 6/2016 | Hayden | F24H 1/0018 |
| | | | 392/486 |
| 2016/0178239 A1 | 6/2016 | Thornton et al. | |
| 2016/0266588 A1* | 9/2016 | Ward | G05D 23/134 |
| 2017/0343241 A1* | 11/2017 | Chen | F24H 9/20 |
| 2019/0331363 A1* | 10/2019 | Peng | F24H 7/00 |
| 2020/0004231 A1* | 1/2020 | Anderson | F24H 9/2007 |
| 2020/0191439 A1* | 6/2020 | Hughes | G05D 23/1905 |
| 2022/0180383 A1* | 6/2022 | Arrojula | F24H 9/133 |

FOREIGN PATENT DOCUMENTS

| | | |
|---|---|---|
| CN | 201909441 U | 7/2011 |
| CN | 102213489 A | 10/2011 |
| CN | 203203717 U | 9/2013 |
| EP | 0356609 A1 | 3/1990 |
| EP | 0531072 A1 | 3/1993 |
| EP | 0699316 B1 | 7/1999 |
| EP | 0967440 A2 | 12/1999 |
| EP | 1148298 B1 | 10/2004 |
| EP | 1621814 A2 | 2/2006 |
| EP | 1178748 B1 | 10/2006 |
| EP | 2108140 B1 | 6/2012 |
| FR | 2820206 A1 | 8/2002 |
| GB | 2211331 A | 6/1989 |
| JP | H08264469 A | 10/1996 |
| JP | 2005283039 A | 10/2005 |
| JP | 2006084322 A | 3/2006 |
| JP | 2008008548 A | 1/2008 |
| JP | 2011220560 A | 11/2011 |
| TW | 1431223 B | 3/2014 |
| WO | 9718417 A1 | 5/1997 |
| WO | 2008102263 A2 | 8/2008 |
| WO | 2009022226 A2 | 2/2009 |
| WO | 2009061622 A1 | 5/2009 |
| WO | 2011104592 A1 | 9/2011 |

OTHER PUBLICATIONS

AO Smith, "AO Smith ICOMM Remote Monitoring System," Instruction Manual, 64 pages, Jun. 2009.
U.S. Appl. No. 14/689,896, filed Apr. 17, 2015.
U.S. Appl. No. 14/964,392, filed Dec. 9, 2015.
U.S. Appl. No. 15/061,520, filed Mar. 4, 2016.
U.S. Appl. No. 15/166,110, filed May 26, 2016.
Filibeli et al., "Embedded Web Server-Based Home Appliance Networks," Journal of Network and Computer Applications, vol. 30, pp. 499-514, 2007.
Halfbakery.com, "Hot Water Alarm," 2 pages, Sep. 4, 2002.
Heat Transfer Products Inc., "Specification for Heat Transfer Products, Inc., Vision 3 System," 2 pages, Mar. 17, 2006.
Hiller, "Dual-Tank Water Heating System Options," ASHRAE Transactions: Symposia, pp. 1028-1037, Downloaded Nov. 16, 2012.
Honeywell International Inc., "CS8800 General Assembly, Drawing No. 50000855," 2 pages, Oct. 24, 2008.
Honeywell International Inc., "Thermopile Assembly, Drawing No. 50006821," 1 page, Jun. 18, 2010.
Honeywell International Inc., "Thermopile Element, Drawing No. 50010166," 1 page, Apr. 1, 2005.

(56) References Cited

OTHER PUBLICATIONS

Honeywell International Inc., "Thermopile General Assembly, Drawing No. 50006914," 1 page, Jan. 12, 2006.

Honeywell International Inc., Photograph of a CS8800 Thermocouple Assembly, 1 page, saved Oct. 9, 2014.

http://nachi.org/forum/f22/dual-water-heater-installations-36034/, "Dual Water Heater Installation," 10 pages, printed Oct. 1, 2012.

http://www.whirlpoolwaterheaters.com/learn_more/energysmartelectricwaterheateroperation.aspx, link no longer functions, "Energy Smart Electric Water Heater Operation," 3 pages, prior to Nov. 13, 2012.

http://www.whirlpoolwaterheaters.com/learn-more/eletric-water-heaters/6th-sense%E2% . . . , "Whirlpool Energy Smart Electric Water Heater, Learn More," 3 pages, printed Jan. 15, 2015.

Industrial Controls, "Basics of PID Control (Proportional+Integral+Derivative)," downloaded from https://web.archive.org/web/20110206195004/http://www.industrialcontrolsonline.com/training/online/basics-pid-control-proportionalintegralderivative, 4 pages, Feb. 6, 2011.

InspectAPedia, "Guide to Alternative Hot Water Sources," 6 pages, printed Oct. 1, 2012.

Johnson Controls, "K Series BASO Thermocouples, Heating Line Product Guide 435.0, Thermocouples Section, Product Bulletin K Series," 8 pages, Oct. 1998.

Lennox, "Network Control Panel, User's Manual," 18 pages, Nov. 1999.

Moog, "M3000 Control System, RTEMP 8, Remote 8-Channel Temperature Controller with CanOpen Interface," 6 pages, Nov. 2004.

Process Technology, "Troubleshooting Electric Immersion Heaters," downloaded from http://www.processtechnology.com/troubleshootheaters.html, 3 pages, Mar. 22, 2010.

Raychem, "HWAT-ECO," Tyco Thermal Control, 4 pages, 2012.

Reliance Water Heaters, "Service Handbook for Standard Residential FVIR Gas Water Heaters, Models: G/LORT, G/LORS, G/LBRT, G/LBRS/ G/LBCT, G/LBCS, G/LKRT, G/LKRS, G/LKCT, G/LART, G/LARS, G/LXRT, GLQRT—Series 200/201 and Series 202/203," 44 pages, Nov. 2009.

Techno Mix, "Installation-Series and Parallel," downloaded from www.chinawinds.co.uk/diy_tips/installation_series_and_parallel.html, 5 pages, printed Oct. 1, 2012.

Triangle Tube, "Prestige Solo Condensing High Efficiency Gas Boiler," 4 pages, revised Apr. 30, 2012.

Prosecution History from U.S. Appl. No. 14/225,308, dated Oct. 6, 2016 through Apr. 12, 2018, 144 pp.

\* cited by examiner

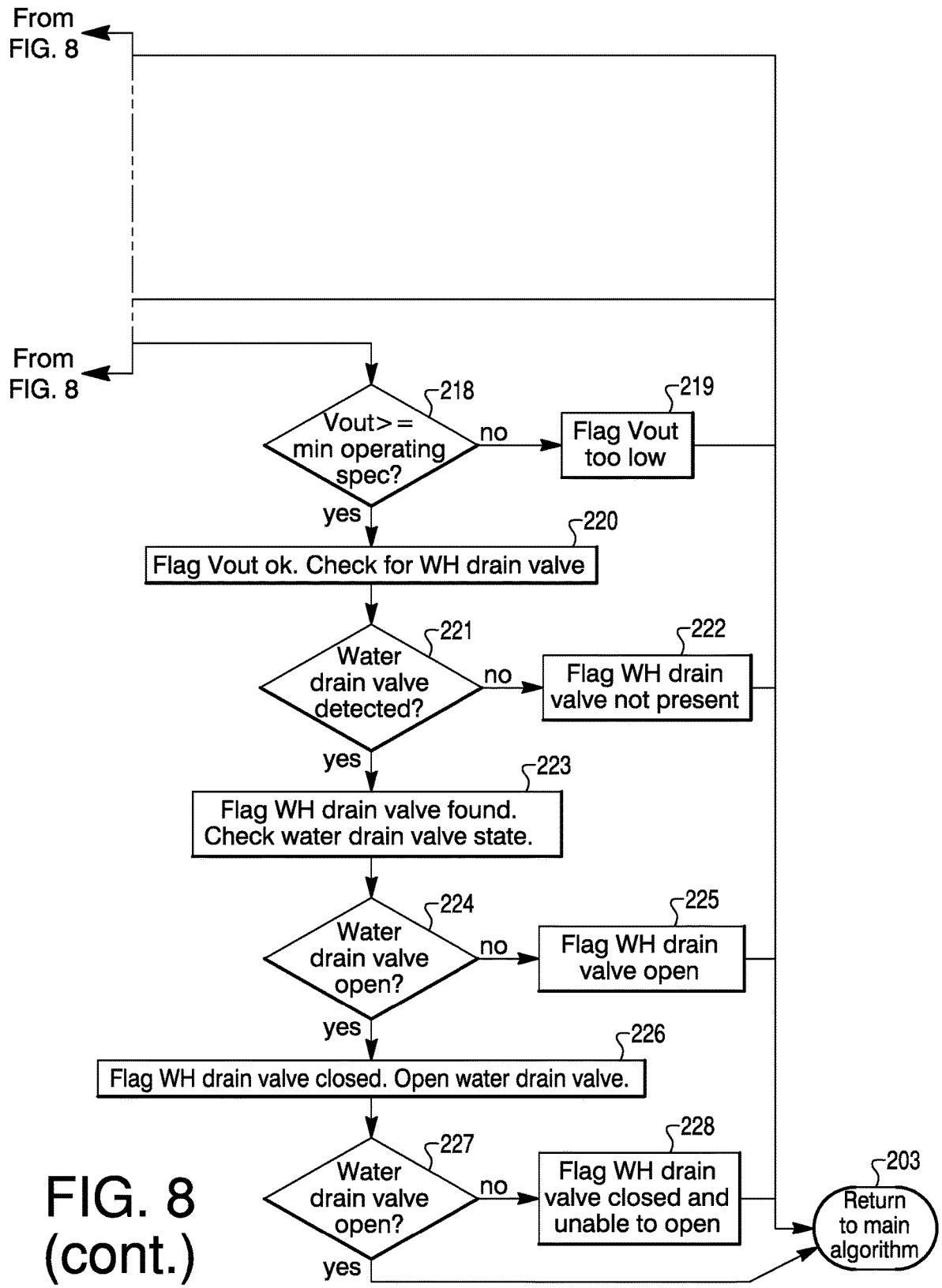

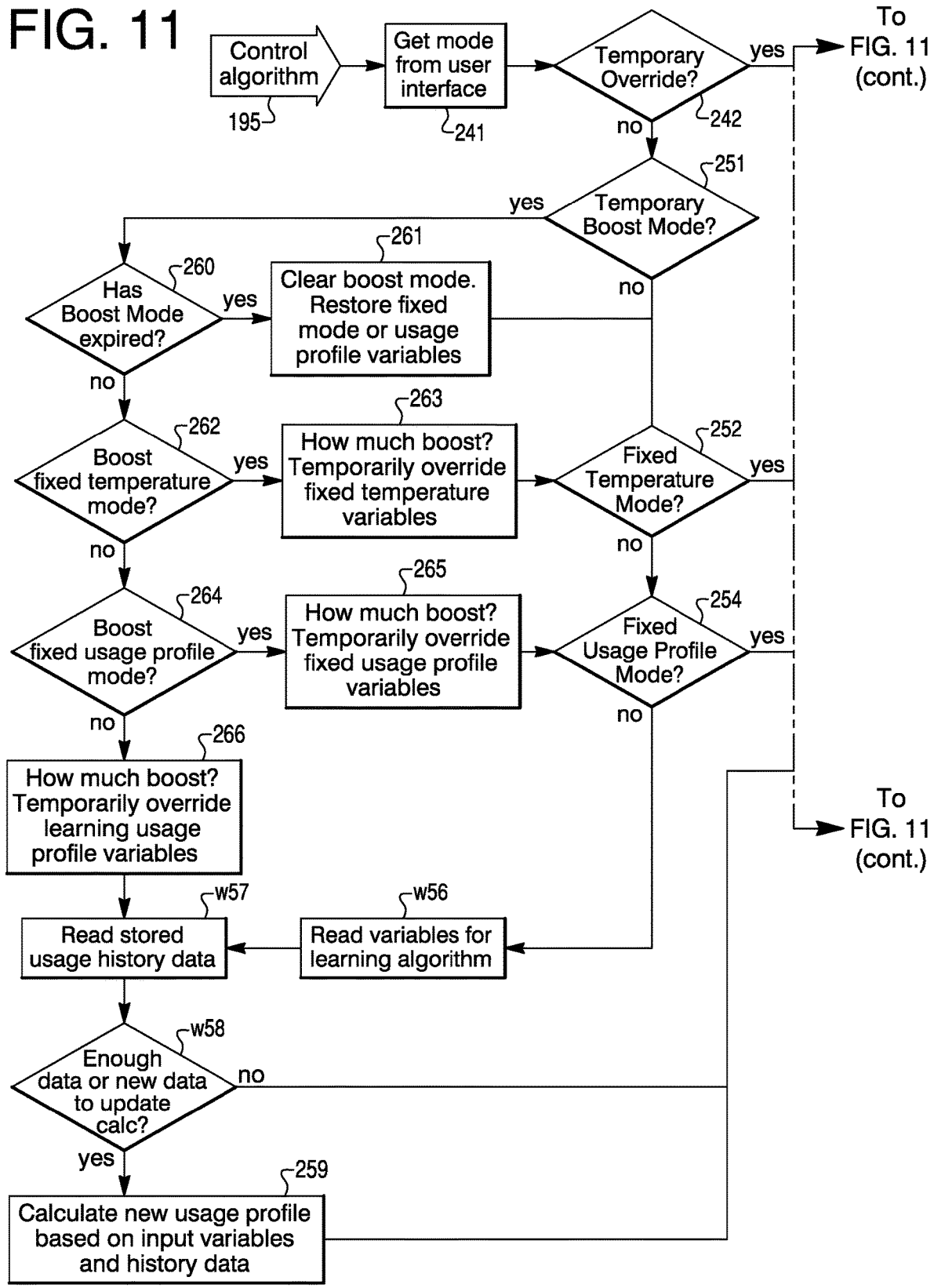

SYSTEM FOR COMMUNICATION, OPTIMIZATION AND DEMAND CONTROL FOR AN APPLIANCE

This application is a Continuation of U.S. patent application Ser. No. 14/225,308, filed Mar. 25, 2014. U.S. patent application Ser. No. 14/225,308, filed Mar. 25, 2014, is hereby incorporated by reference.

BACKGROUND

The present disclosure pertains to control and optimization of a heating appliance.

SUMMARY

The disclosure reveals a system and approach for developing a periodic water usage profile and demand for controlling a water heater. A mode may be selected for demand for a certain amount of water of a particular temperature range to be available for use from the water heater. Data on hot water usage may be collected and the usage profile and demand may be calculated from the data. The water heater may be programmed to operate in a certain fashion based on the usage profile and demand. A control knob may be on the water heater control to select a particular demand. Control of the water heater may be operated from a remote device connected in a wireless or wired fashion. An optimization program may be implemented in the control of the water heater for achieving one or more beneficial goals related to water heater performance and hot water production.

DESCRIPTION

Figure 1A:
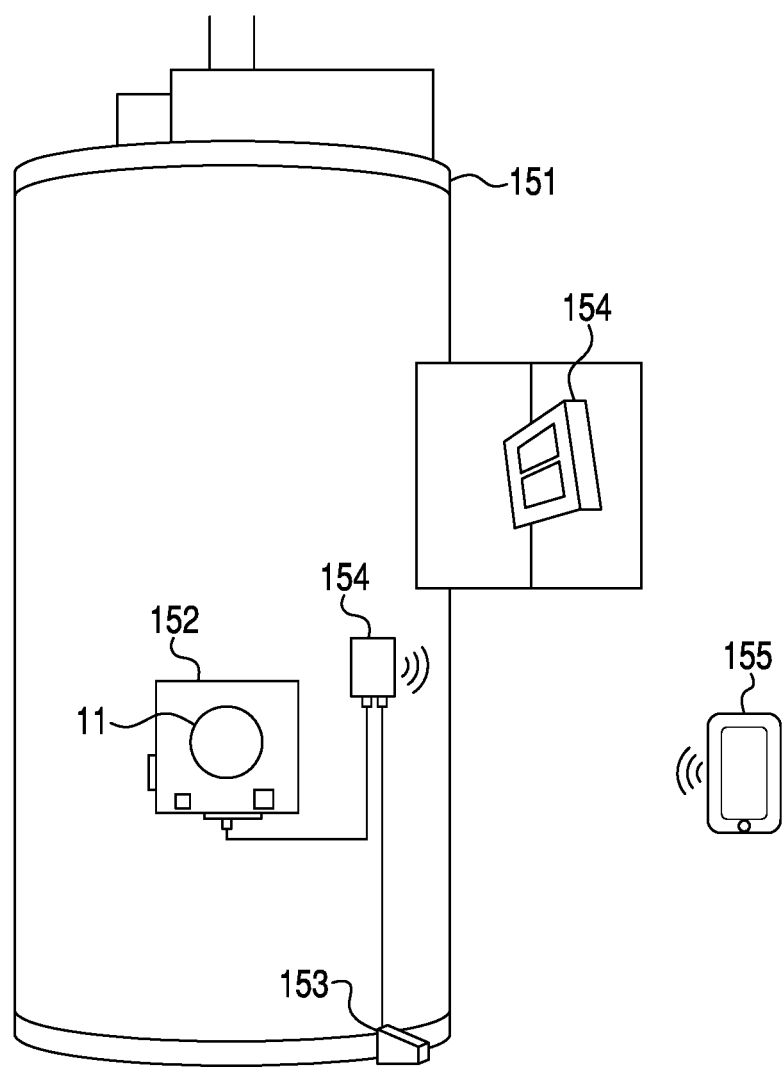
FIG. 1a is a diagram of a water heater having a water heater control.

The present system and approach may incorporate one or more processors, controllers, computers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Water heater regulations and customers may continuously demand higher efficiency and lower energy usage. This need may be addressed by either improving the fundamental efficiency of the water heater or by heating the water only as needed to meet the user demand. The present system may take the approach of heating the water only as needed.

There may be a water heater control with a user-demand feature. Related art water heater controls may have a control knob which primarily controls the temperature set point. The set point may set and left at a fixed level.

To control the water temperature to meet demand, similar to many home thermostats, an external device may be added to controls. The present system may provide a simplified user demand setting. It may provide less functionality than having the external device, but would cost both manufacturer and the end user less and still provide energy savings. Energy savings may be on the order of 30 percent.

Instead of having control knob settings like "Hot, A, B, C, Very Hot", the control knob may have settings like "Hot, Light Demand, Medium Demand, High Demand, Very Hot". The "Hot" and "Very Hot" settings may be unchanged from their present operation. The settings may control the set point. There may also be intermediate or additional fixed set points, but those are not necessarily shown in the Figures herein. However, the demand modes may provide hot water at the times and in the amounts that the hot water is needed. This may be accomplished in two ways. Hot water may be provided either based on 1) usage patterns, which could be simplest to set up and use, or based on 2) a preprogrammed time-temperature profile, which would require a separate user interface, and may or may not include a learning algorithm to adjust the profile for purposes such as maximizing efficiency or maximizing hot water availability. The present system may be implemented primarily through software.

Flow charts herein may illustrate a high-level process. A flow chart may show water heater control with a user demand feature.

Bi-directional communication architecture and optimizing software for gas and electric water heaters may be noted. The energy storage aspect of a tank water heater may significantly change the algorithm requirements to achieve the time-temperature profile that users are familiar with through their home thermostats. A manufacturer may currently have a 60+ percent share of the gas water heater segment. Beyond the initial sale of the gas water heater valve, the manufacturer does not necessarily have the capability to generate additional revenues from the installed base of water heaters using its controls. While the manufacturer's control may have a communicating feature, there appears no easy way for a homeowner to communicate with a water heater valve or control. With an ability to communicate with a water heater, multiple offerings/features may be developed that can generate revenue for the manufacturer.

The present system may allow communication between a smart device and the water heater. The system may also include water heater optimization software that can reduce the cost to operate a water heater, provide for usage pattern based optimization, prognostics for sediment build up and alarming, annual maintenance alarms, performance optimization alerts, and demand response management for utility load shedding.

The present system may also be used to control multiple water heaters together, although system would not necessarily have to be used for this function. For multiple water heaters, the controls may be connected either wirelessly or with a cable.

The present system may consist of a battery powered (or other energy storage approach such as capacitor), flame powered, or plug-in powered wireless communication. The wireless communication module may be a box that provides communication with a manufacturer's VestaCOM™ and ECOM™ to communicate with the valve. The wireless communication (e.g., WiCOM) may communicate wirelessly with a smart device such as a Kindle™, iPad™, PC/laptop, or Wi-Fi™ (WiFi™) router. The WiCOM may also include water heater optimization software. Wireless communication may be a feature of the add-on control module. Wireless communication may be a function that is separate from optimization software.

The WiCOM device may be a slave device to the water heater control valve. The WiCOM device may be embedded in the water heater control itself.

The controller/communications device may be sold directly at many retail stores. Consumers may purchase the device to link the water heater control with their smart device. Consumers may then download the latest version of the water heater optimization software from a website of the manufacturer. The software may provide for an interactive screen where consumers answer key questions about their hot water usage. This approach may allow the device to change water heater set points and optimize operation of the water heater.

A communication module may also permit an interface with the manufacturer's thermostats either as a way to control water heater settings or as a way to read the home heating/cooling schedule on another smart device and apply that schedule to the water heater usage profile.

A standing pilot automatic relight or conversion to intermittent pilot for a standing pilot water heater may be noted. Standing pilot appliances may have some issues. First, the pilot may continuously consume energy/gas that is mostly wasted. Second, the pilot may go out and the appliance will then no longer function until someone manually relights the pilot.

The appliances to which the pilot applies may include water heaters, furnaces, stoves/ovens, and so forth, but can focus on the Vesta™ water heater control hereafter because that control has the specific circuit and hardware necessary for the present system to work. However, the pilot may also apply to any appliance control that has similar hardware.

The present system may be a device that can relight the pilot automatically on a Vesta water heater valve, but does not necessarily require an external power source such as a wall outlet. Because the device may do this, it may also convert a standing pilot Vesta water heater valve into an intermittent pilot, saving 500-700 BTU/hr. of gas consumption. If this functionality were included in a device that included communication to a Wi-Fi network and/or the internet, then it could also send messages to the homeowner (such as attempting to relight if pilot is intended to be left on as a standing pilot, success or failure to relight, the amount of hot water available and its temperature).

A device may have energy storage that could be charged through an RS232 VestaCom port on a Vesta water heater controller or another connection location that could be added to the controller that is connected to the internal voltage source. As mentioned in herein, the relighting feature may be included in that device. However, it may also be possible to create a simpler device that has the same energy storage and relighting feature, but would not have the other features such as communication, support for a leak detector and water shutoff valve, and so on. Such a device may be solely for the purpose of relighting the pilot and/or converting a standing pilot Vesta to an intermittent pilot.

Figure 13:
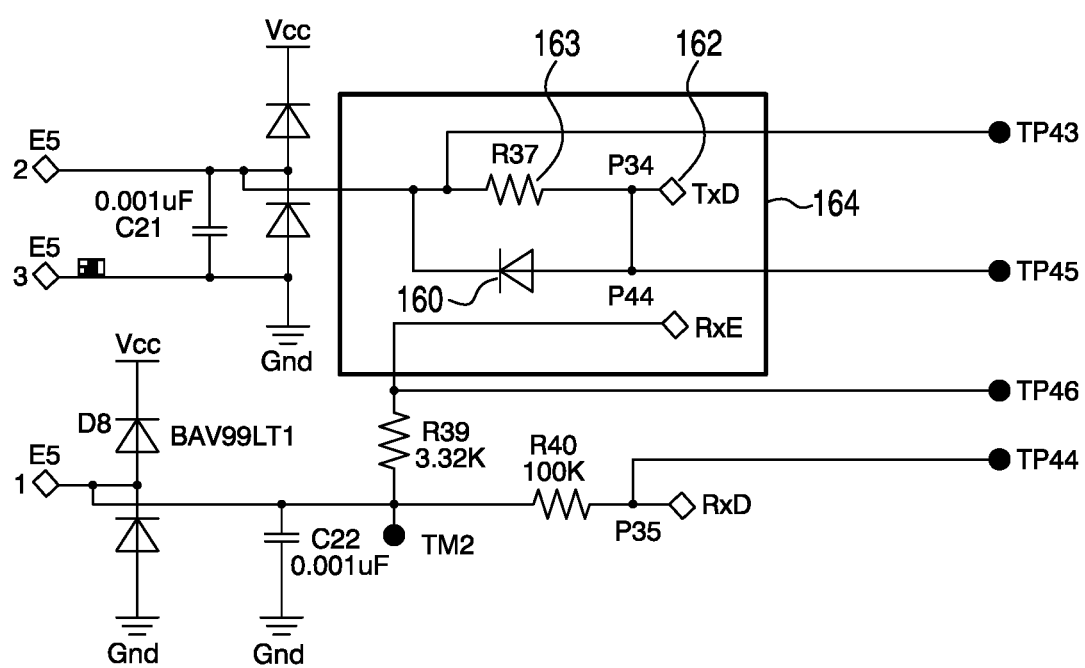
FIG. 13 is a circuit diagram having a diode added in parallel to a resistor in a transmitting line for a control circuit.
Figure 14A:
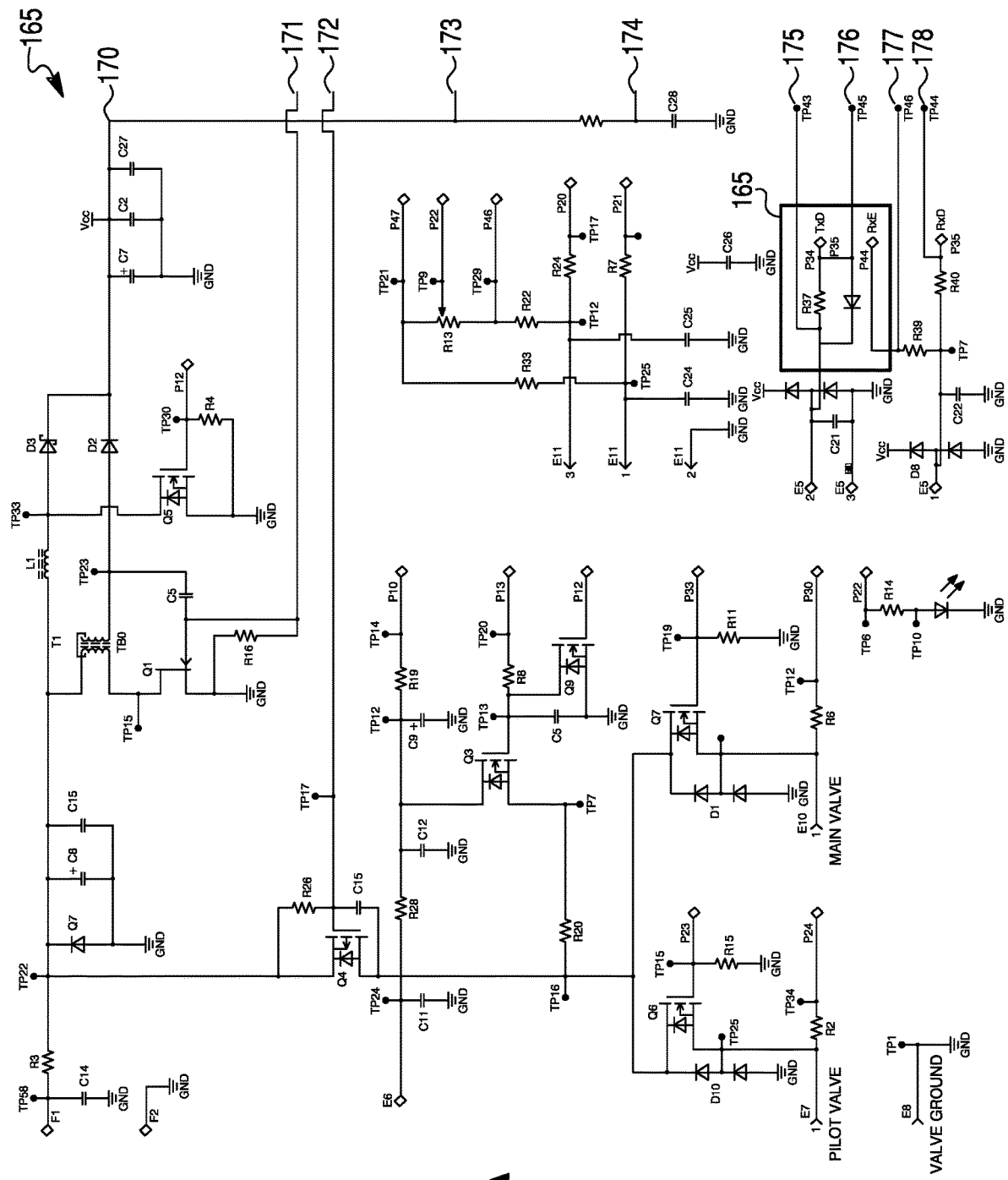
FIGS. 14a and 14b constitute a schematic showing a context of the diode in the diagram of FIG. 13.
Figure 14B:
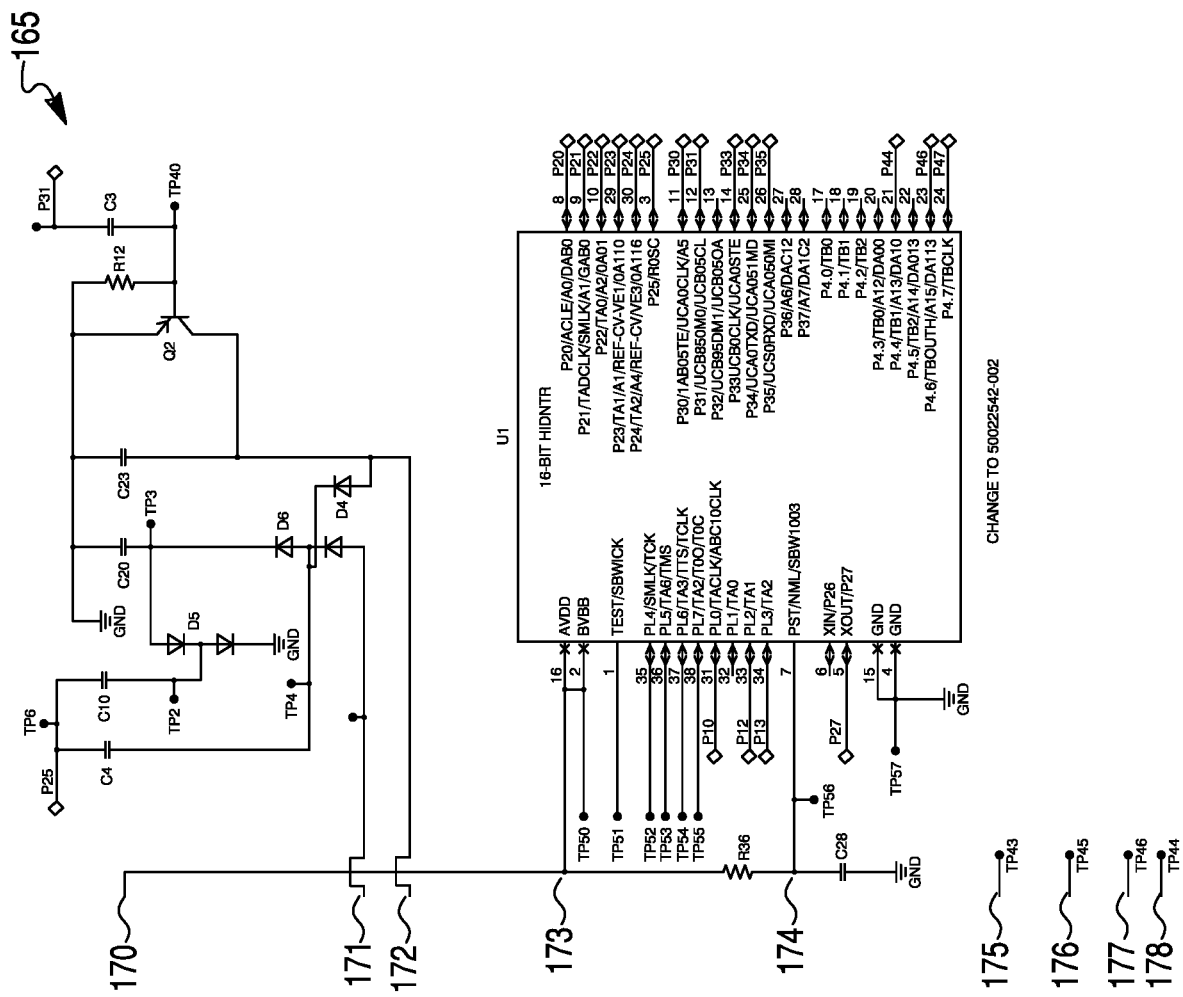

The device's key functional blocks may include: 1) circuitry necessary to store energy; 2) a circuit to ignite the pilot similar or identical to the standard circuit in power vent water heater controls; 3) a microprocessor; and 4) an RS232 communication circuit modified to allow current to flow from the Vesta's RS232 Tx line to charge/power the device. The present system may have a circuit area 164 of FIG. 13 with a diode 160 added in parallel to a resistor 163 in the Tx line 162, but it is not necessarily needed. Circuit area 164 is shown in a context of a circuit 165 of FIG. 14a and FIG. 14b. Common wires and connections of circuit 165 may be indicated by numerals 170, 171, 172, 173, 174, 175, 176, 177 and 178.

Alternately, another connection location may be added to the Vesta controller that is connected to the internal voltage source.

In the case of a device intended to relight the pilot if it goes out, the device may monitor the thermopile voltage or other detection or source through the RS232 to determine if the pilot is lit. The monitoring could be periodic, maybe once, for example, every 5 minutes, to conserve power. If the thermopile voltage dropped below a minimum threshold or if communication were lost, then the device may recognize that the pilot has gone out and that the Vesta controller has stopped functioning. Using the energy stored in the device, power may be applied through the Vesta's RS232 Tx line to bring the Vesta controller's Vcc back up and operate the control. The device may then send a message to the Vesta control's Rx line to open the pilot valve. Once the pilot is open, the device may activate its spark ignition circuit to ignite the pilot. It may continue to do this every few seconds for some short period of time, possibly 30 seconds, and then remove power from the Tx line, check for communications with the Vesta control and check the thermopile voltage. If communications fail, the system may continue to attempt to relight the pilot until the stored energy is nearly depleted. If the device is equipped with WiFi, before the stored energy is depleted, it may send a message indicating a failure to relight and the amount of hot water available. Whether or not the device is equipped with WiFi, it may be possible to use the last of the stored energy to sound an audio alarm to alert the homeowner that the water heater control has shut down.

The case of a device intended to convert the standing pilot to intermittent pilot may be noted. The device may operate in a similar manner as noted herein, but when a main burn cycle is completed, the device may then instruct the Vesta controller to shut down the pilot valve. While the pilot is shut down, the controller may periodically, possibly, for example, every 10 minutes, apply power to the Vesta controller to wake it up and read the water temperature. If the water temperature has dropped to a level requiring a burn cycle, then the device may light the pilot, restore the Vesta control to normal operation, and recharge the stored energy as much as possible during the burn cycle. If the amount of energy stored has dropped below a specified threshold, the device may light the pilot, restore the Vesta control to normal operation, and activate a function to recharge the stored energy, although a main burn cycle may not be needed during this time.

It may be possible to have the device do either a simple relight function or convert to a standing pilot by putting a selector switch on the device to change between these two modes. In the case of a device with WiFi communication capability, these modes may be selected through a smart phone or device.

FIG. 1a is a diagram of a water heater 151 having a water heater control 152 and a leak sensor 153. Water heater control 152 may have a control knob 11. A wireless control 154 may be attached to water heater 151. Wireless control 154 may be connected to leak sensor 153 and water heater control 152. A designated website may be visited with a smart device 155 where an applicable app may be downloaded and device 155 in turn may connect to the wireless control 154. FIGS. 1c-1i are diagrams showing various views of an example smart device 155. For examples, one view reveals a temperature adjustment for water heater 151 and another view reveals alarms and alerts such as a low water heater capacity warning. Device 155 may instead be wired to control 154. Additional accessories besides the leak detector may be attached to the device.

Figure 1B:
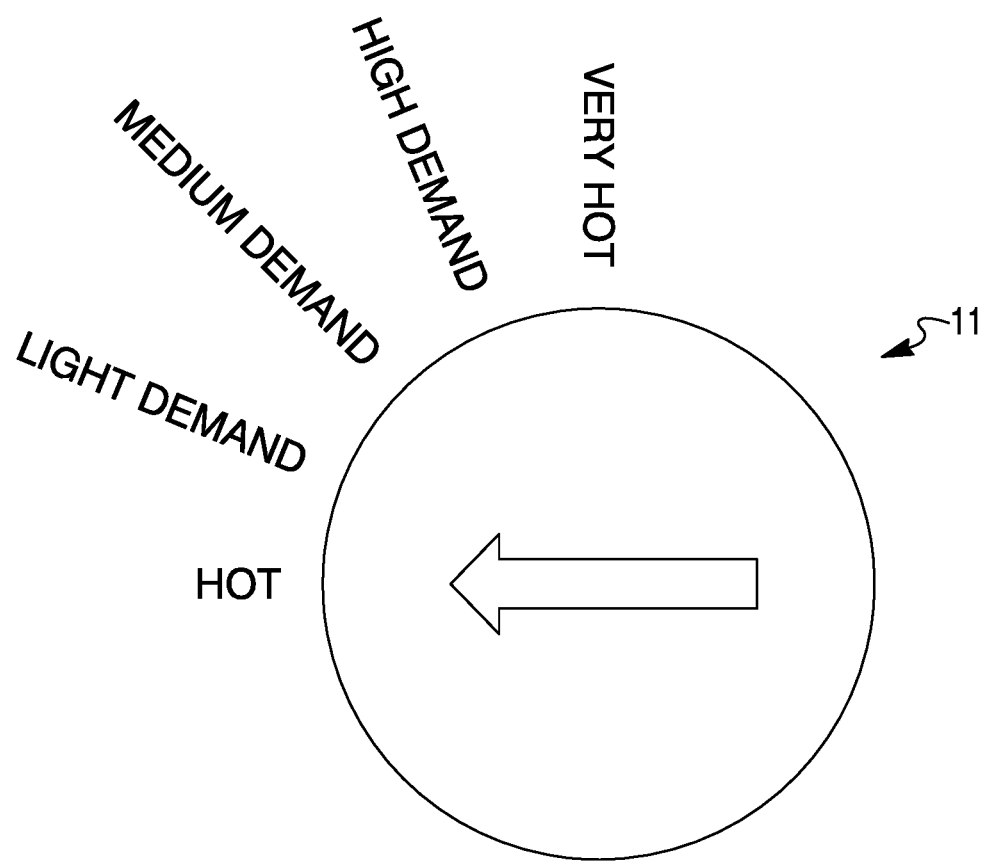
FIG. 1b is a diagram of control knob that may be used with a control for a water heater.
Figure 1C:
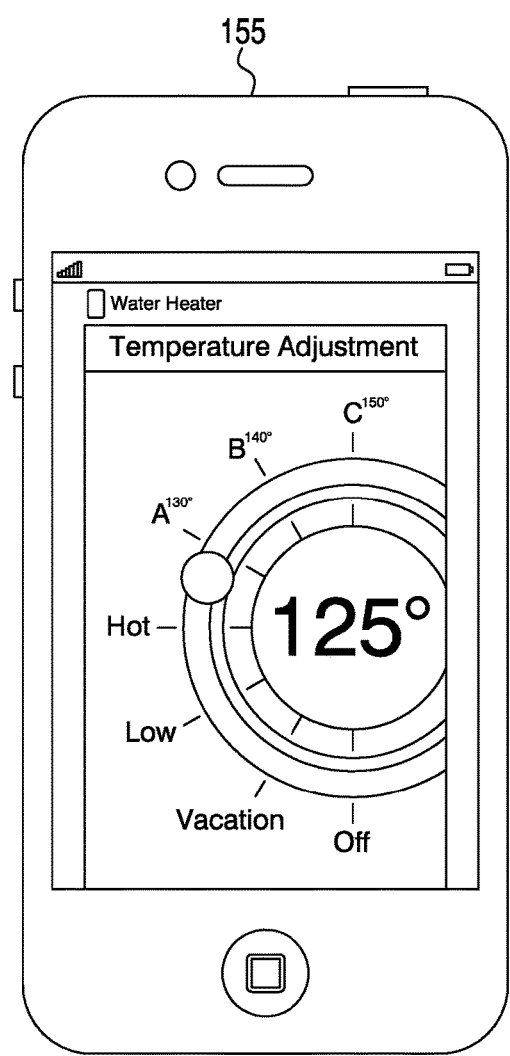
FIGS. 1c-1i are diagrams showing various views of an example smart device.
Figure 1D:
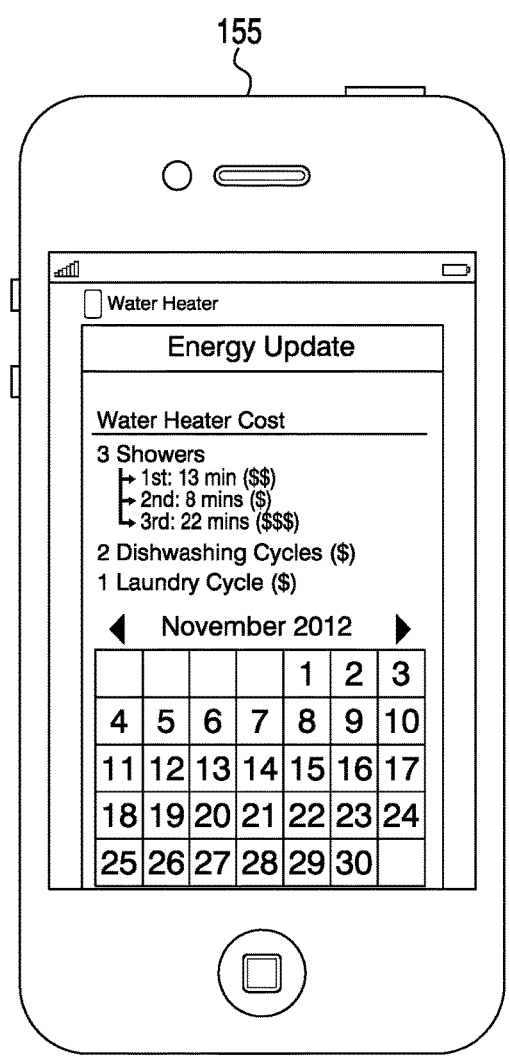
Figure 1E:
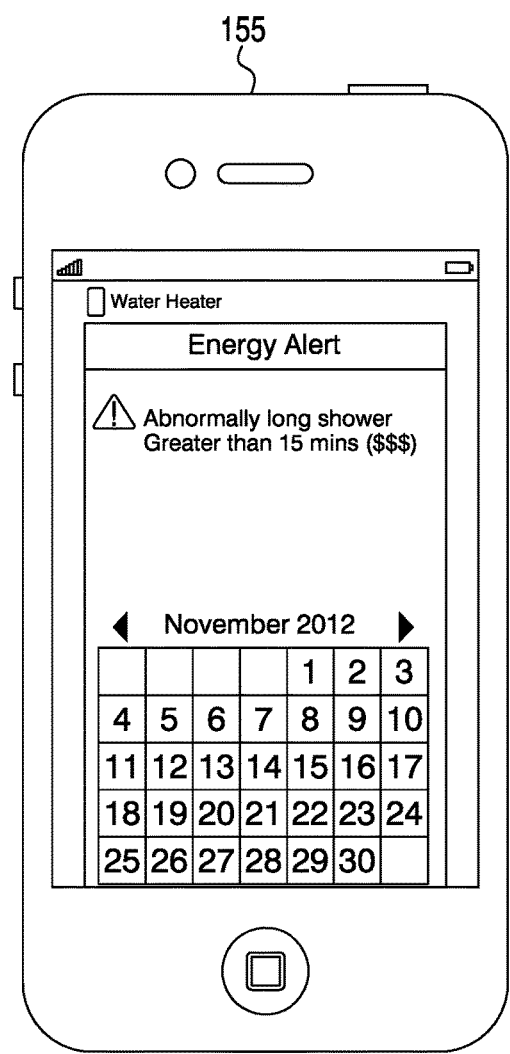
Figure 1F:
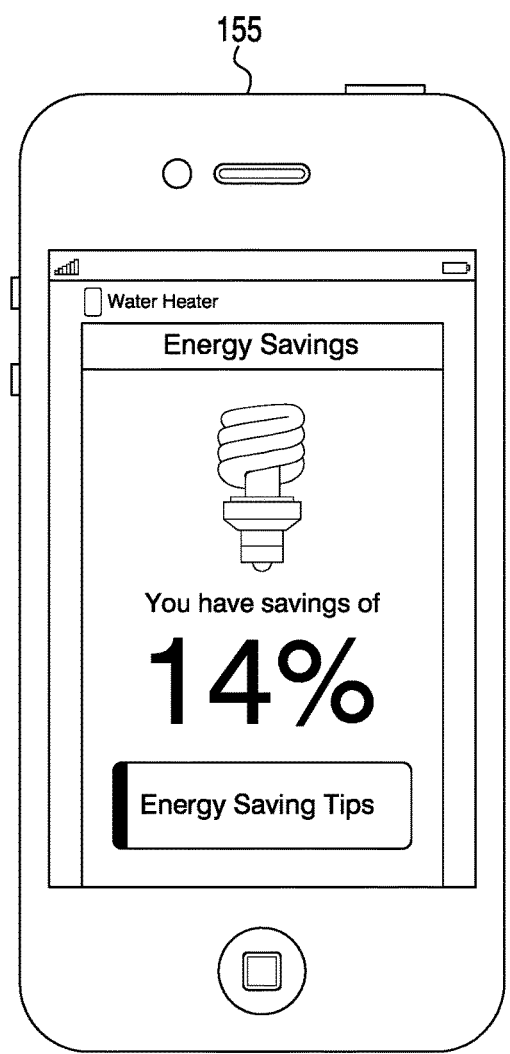
Figure 1G:
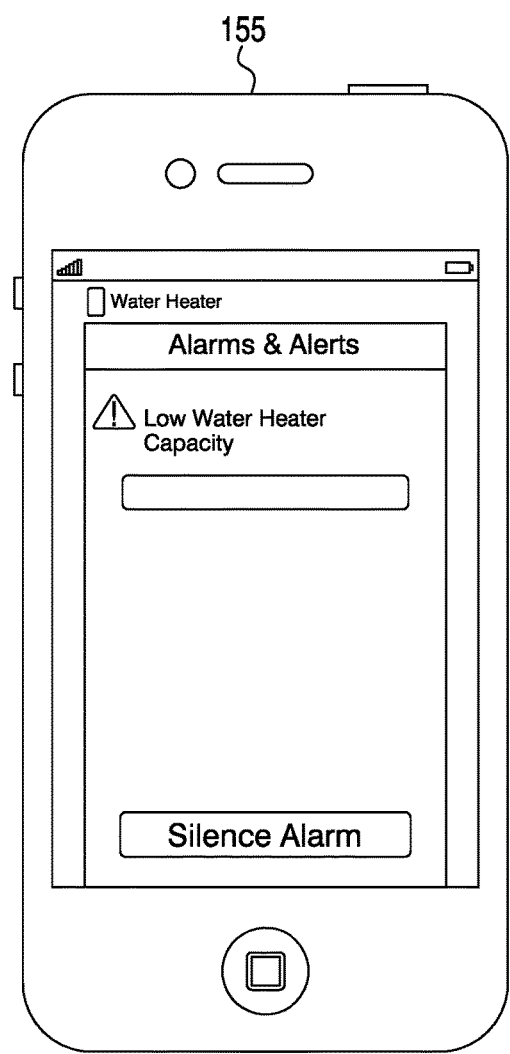
Figure 1H:
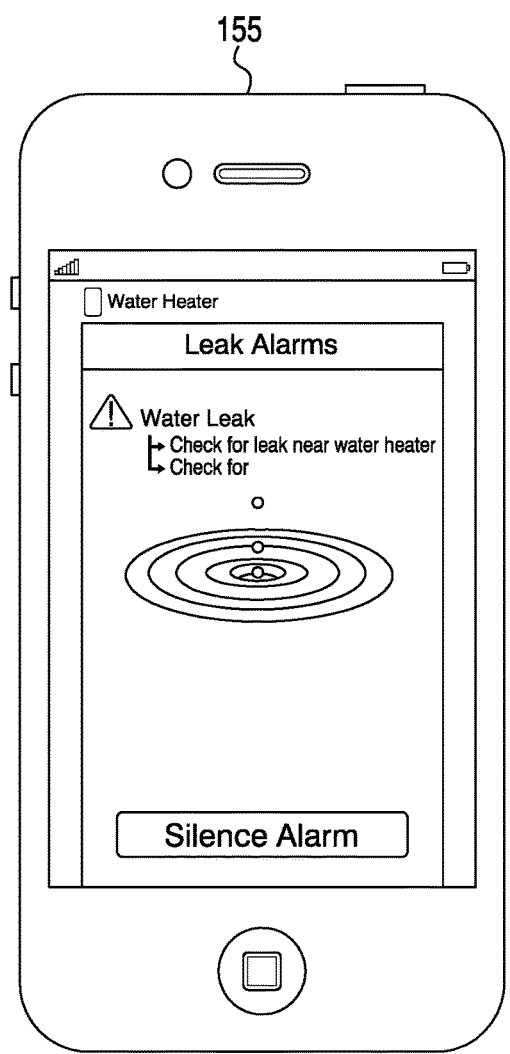
Figure 1I:
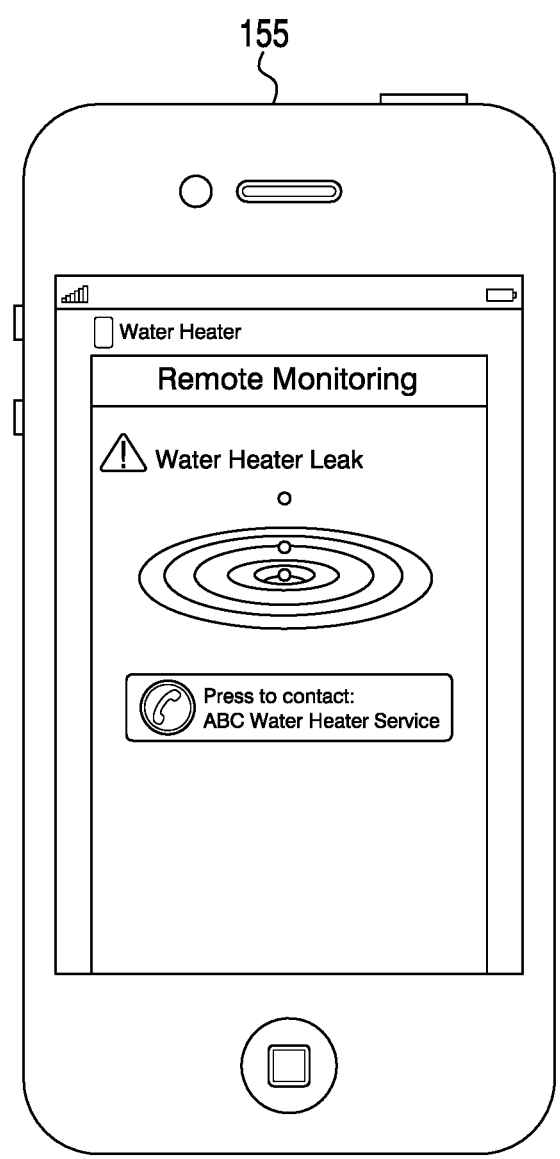

FIG. 1b is a diagram of control knob 11 that may be used with a control for a water heater or other like appliance. Control knob 11 may have a setting upon which a selection can be made. The selections may incorporate "Hot", "Light Demand", "Medium Demand", "High Demand", and "Very Hot".

Figure 3:
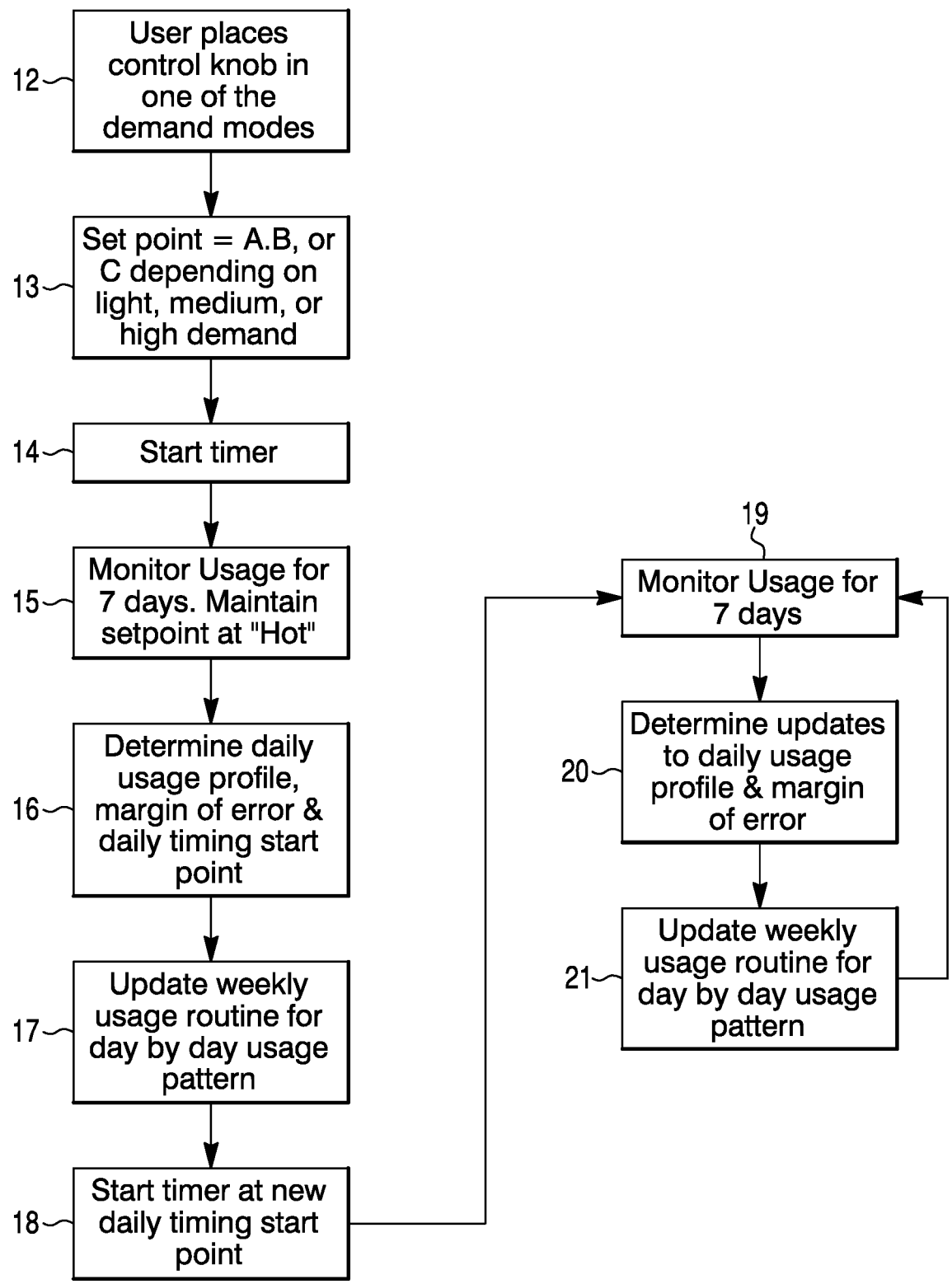
FIG. 3 is a diagram of activity relative to demand based on user programmed patterns.

FIG. 3 is a diagram of activity relative to a demand that may be based on usage patterns. The various items of activity may be indicated as steps, blocks, symbols or the like. Symbol 12 may indicate a user that places the control knob in one of the demand nodes. A set point may equal A, B or C, depending on light, medium or high demand, as indicated in symbol 13. The level of demand may also indicate a statistical confidence level used in determining the confidence that a user will have hot water at any desired time based on usage history. A timer may be started at symbol 14. At symbol 15, hot water usage may be monitored for seven days while the set point is maintained at "Hot". A daily usage profile, margin of error and daily timing start point may be determined at symbol 16. A weekly usage routine or day by day usage pattern may be maintained, as indicated in symbol 17. Symbol 18 indicates that the timer may be started at a new daily timing start point. According to symbol 19, usage of hot water may be monitored for seven days. Updates to a daily usage profile and margin of error may be determined at symbol 20. A weekly usage routine for a day by day usage pattern may be updated according to symbol 21. The updated weekly usage routine may be provided from symbol 21 to symbol 19 where hot water usage is monitored for seven days.

Figure 2:
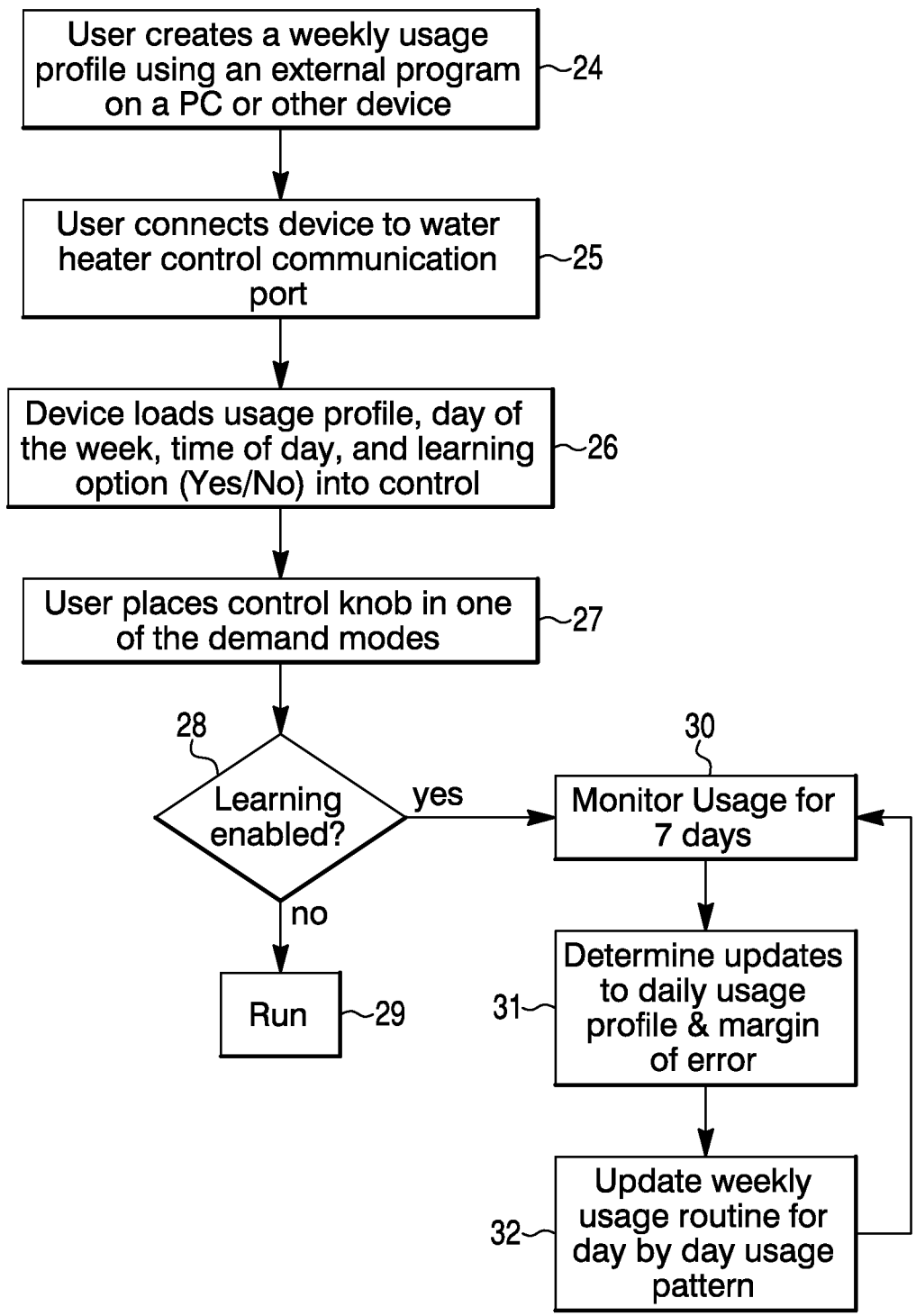
FIG. 2 is a diagram of activity relative to a demand that may be based on usage patterns.

FIG. 2 is a diagram of activity relative to a demand based on user programmed patterns. At symbol 24, a user may create a weekly usage profile using an external program on a computer or other device. The user may connect a device to a water heater control communication port at symbol 25 or connects communications wirelessly or by wire. The device may load a usage profile, day of the week, time of the day and enable or disable a learning option into the control at symbol 26. A question indicated at symbol 28 may be whether learning is enabled. If not, then a run may occur at symbol 29. If yes, then usage may be monitored for seven days at symbol 30. Symbol 30 may also indicate to enter run mode. Updates to a daily usage profile and margin of error may be determined at symbol 31. At symbol 32, a weekly usage routine for a day by day usage pattern may be updated. After symbol 32, the user may return to symbol 30, and proceed through the activity indicated in noted symbols 30-32.

Figure 4A:
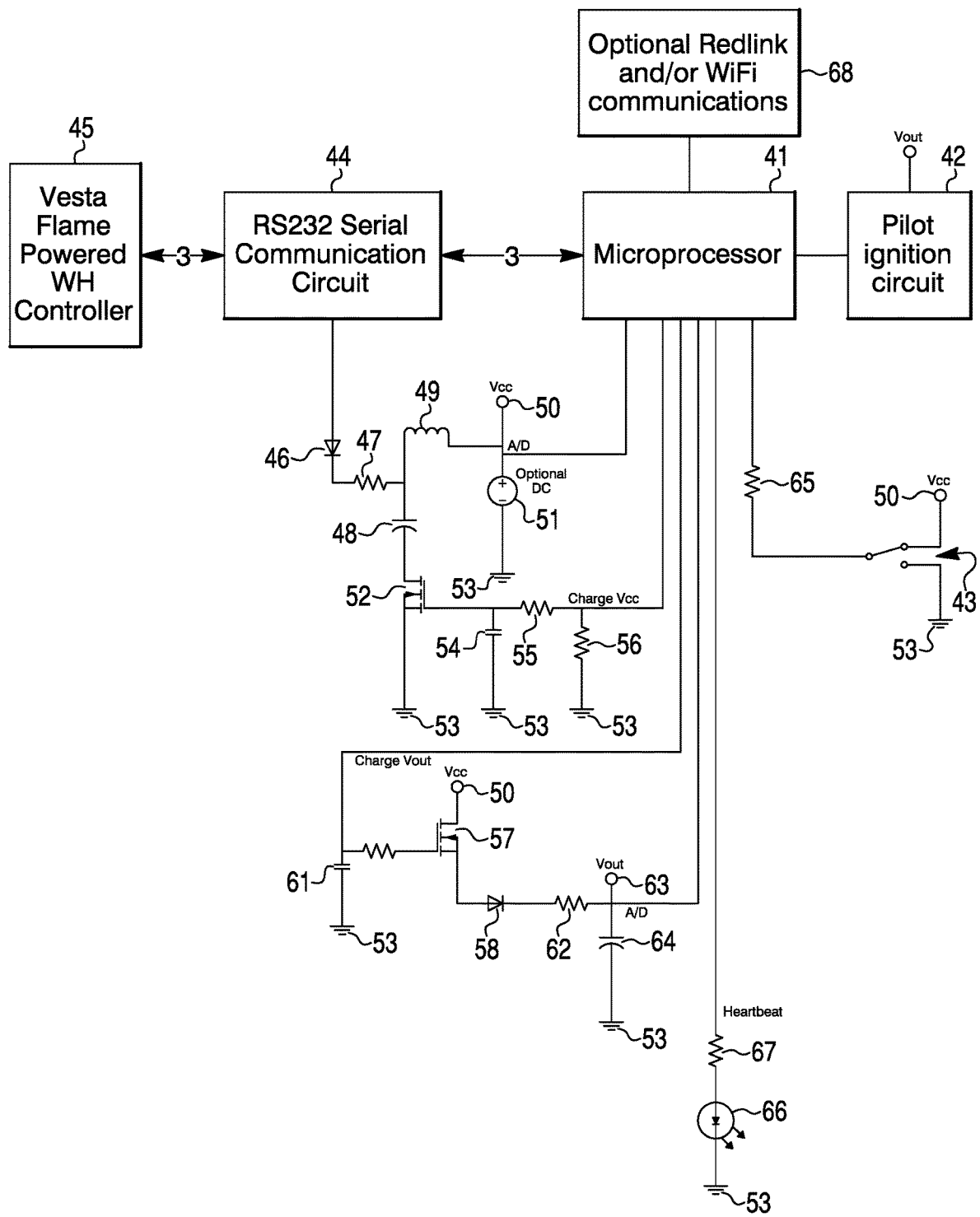
FIG. 4a is a diagram of a circuit relating to pilot lighting components.

FIG. 4a is a diagram of a circuit relating to pilot lighting components. A microprocessor 41 may connected to a pilot ignition circuit 42 having a Vout terminal 63 that may be connected to an igniter or sparker for lighting the pilot. A node switch 43 may be connected to processor 41 via a resistor 65. Mode switch 43 may be used to select an automatic pilot relight or an intermittent pilot. Processor 41 may be connected to an RS232 serial communication circuit 44. Communication circuit 44 may be connected to a (Vesta) flame powered water heater controller 45. An output from circuit 44 may go through a diode 46 and resistor 47 to one end of a capacitor 48 and one end of an inductor 49. The other end of inductor 49 may be connected to a positive terminal of an optional DC source 51 and to microprocessor 41, and to a terminal 50 for Vcc. The other end of capacitor 48 may be connected to a drain of an N-channel FET 52. A source of FET 52 may be connected to a ground 53. A gate of FET 52 may be connected to one end of a capacitor 54 and a resistor 55. The other end of capacitor 54 may be connected to ground 53. The other end of resistor 55 may be connected to one end of a resistor 56 and to processor 41 via a line labeled charge Vcc. The other end of resistor 56 may be connected to ground 53.

The components shown and mentioned may be substituted with other components. For example a P channel FET may also work with the appropriate modifications. The approach may incorporate an ability to store energy coming from the thermopile or another energy source, by whatever means.

An N-channel FET 50 may have a drain connected to terminal 50 and a source connected to an anode of a diode 58. A gate of FET 57 may be connected to one end of a resistor 59. The other end of resistor 59 may be connected to processor 41 via a line labeled "Charge Vout" and to one end of a capacitor 61. The other end of capacitor 61 may be connected to ground 53. The cathode of diode 58 may be connected to one end of a resistor 62. The other end of resistor 62 may be connected to processor 41, a terminal 63 for Vout, and one end of a capacitor 64. The other end of capacitor 64 may be connected to ground 53.

A LED 66 may have one terminal connected to ground 53 and another terminal connected via a resistor 67 and a line labeled heartbeat to processor 41. This may be for the purpose of providing a periodic flash of light to show the user that the system is functioning Processor 41 may be connected to an optional wireless communication system 68, such as WiFi or other like system. System 68 may be a plug-in module.

For twinning applications, having two or more water heaters proximate to each other, there may be two or more sets of circuits for RS232 and a pilot ignition versus requiring one control module on each water heater. An extra pilot ignition may be a plug-in module. The two sets or more of circuits may be incorporated in very different operating systems. Other accessories may plug in to a circuit.

Figure 4B:
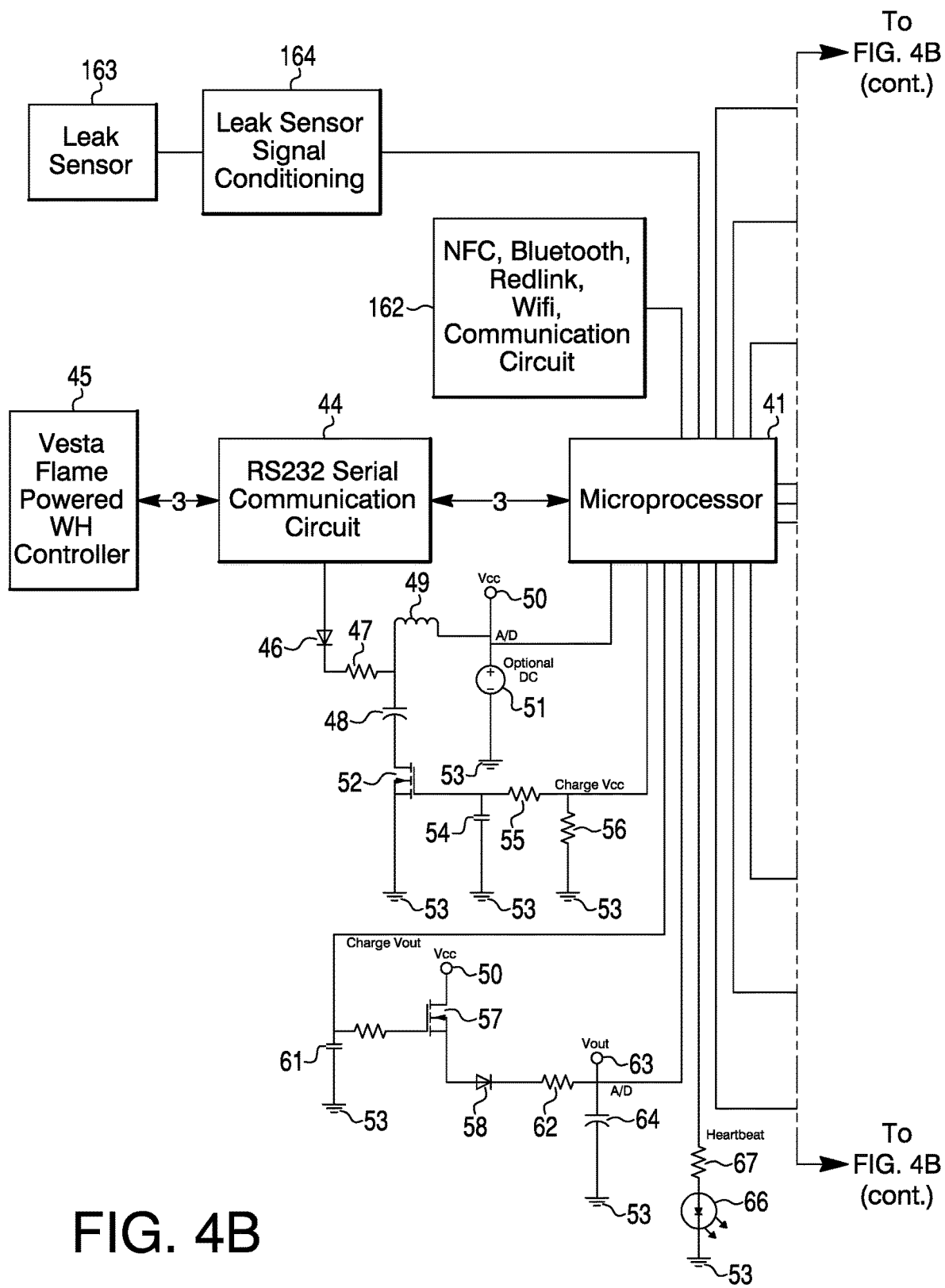
FIG. 4b is a diagram having some circuitry similar to that of FIG. 4a but relating to water heater operation.
Figure 4B:
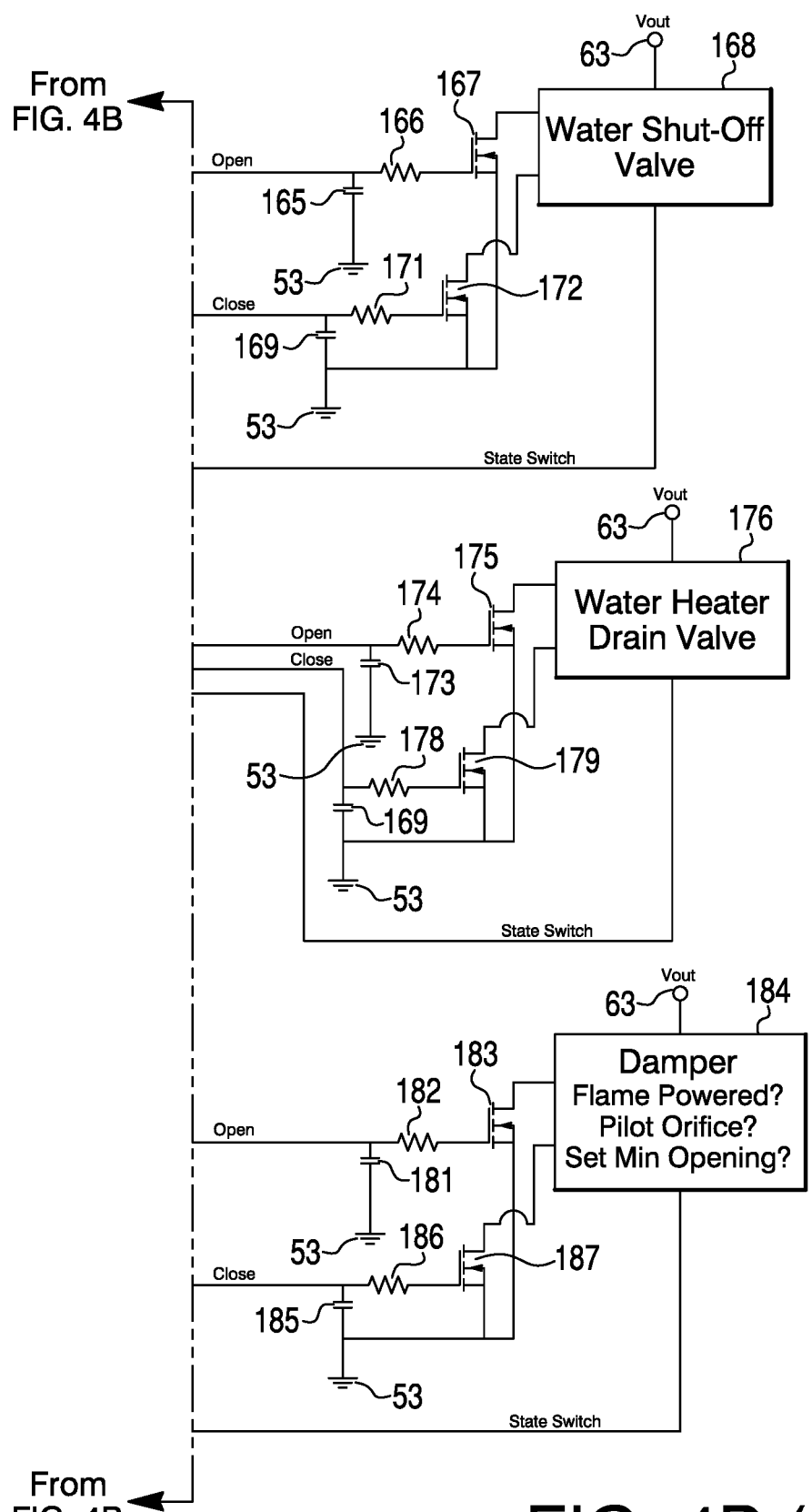

A smart device or computer wired interface may only be needed if WiFi or other wireless communications are incorporated. A software application may be needed in either case FIG. 4b is a diagram having some circuitry similar to that of FIG. 4a but relating to water heater operation. An NFC (near field communication), Bluetooth™, RedLink™, and/ or WiFi™ communication circuit 162 may be connected to microprocessor 41. A leak sensor 163 may be connected to a leak sensor signal conditioning circuit 164. Conditioning circuit may be connected to microprocessor 41.

An open line from processor 41 may be connected to a capacitor 165 and resistor 166. The other end of capacitor 165 may be connected to ground 53 and the other end of resistor 166 may be connected to a gate of an N channel FET 167. FET 167 may have a drain connected to a water shut-off valve 168. Valve 168 may be connected to Vout 63. A source of FET 167 may be connected to ground 53. A close line from processor 41 may be connected to a capacitor 169 and a resistor 171. The other end of capacitor 169 may be connected to ground 53 and the other end of resistor 171 may connected to a gate of an N channel FET 172. FET 172 may have a drain connected to water shut-off valve 168. A source of FET 172 may be connected to ground 53. A state switch line from processor 41 may be connected to valve 63.

An open line from processor 41 may be connected to a capacitor 173 and resistor 174. The other end of capacitor 173 may be connected to ground 53 and the other end of resistor 174 may be connected to a gate of an N channel FET 175. FET 175 may have a drain connected to a water heater drain valve 173. Valve 173 may be connected to Vout 63. A source of FET 175 may be connected to ground 53. A close line from processor 41 may be connected to a capacitor 177 and a resistor 178. The other end of capacitor 177 may be connected to ground 53 and the other end of resistor 178 may be connected to a gate of an N channel FET 179. FET 179 may have a drain connected to drain valve 176. A source of FET 179 may be connected to ground 53. A state switch line from processor 41 may be connected to valve 176.

An open line from processor 41 may be connected to a capacitor 181 and resistor 182. The other end of capacitor 181 may be connected to ground 53 and the other end of resistor 182 may be connected to a gate of an N channel FET 183. FET 183 may have a drain connected to a damper 184 that possibly is flame power, at a pilot orifice and/or having a set minimum opening. Damper 184 may be connected to a Vout 63. A close line from processor 41 may be connected to a capacitor 185 and a resistor 186. The other end of capacitor 185 may be connected to ground 53 and the other end of resistor 186 may be connected to a gate of an N channel FET 187. FET 187 may have a drain connected to damper 184. A source of FET 187 may be connected to ground 53. A state switch line may be connected to damper 184.

Figure 5A:
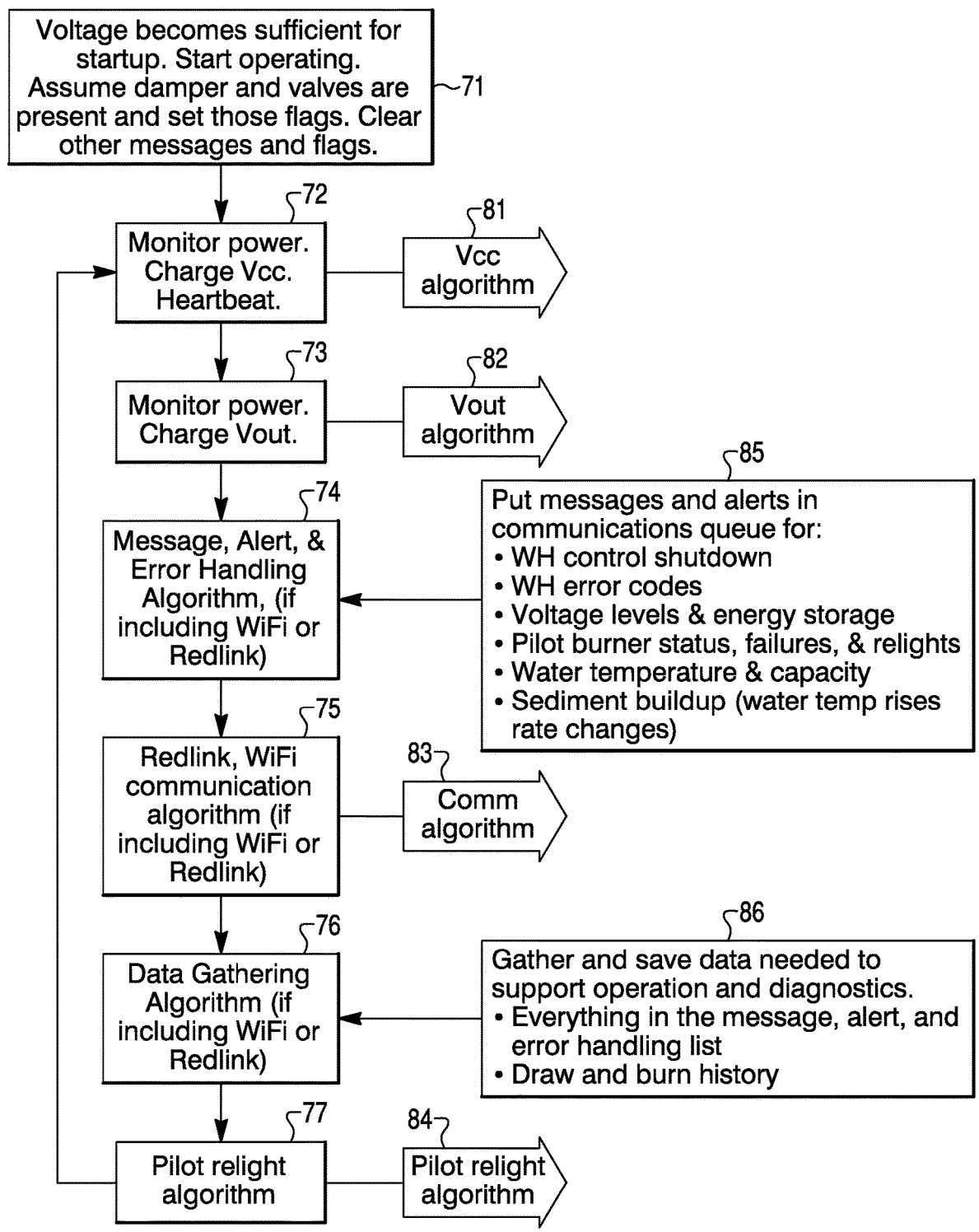
FIG. 5a is a diagram of a flow of activity related to a water heater system.

FIG. 5a is a diagram of a flow of activity related to a water heater system. Symbol 71 indicates that a voltage supply may become sufficient for startup. The system may start operating. A damper and valves may be assumed to be present and their flags may be set. Other messages and flags may be cleared. Power, charge, Vcc and heartbeat may be monitored at symbol 72. These items may be effected with a Vcc algorithm 81. Power and charge Vout may be monitored at symbol 73. The items may be effected with a Vout algorithm 82. At symbol 74, message, alert and error handling may utilize an algorithm if including WiFi or to other wireless mechanism. Messages and alerts may be put in a communications queue for water heater control shutdown, water heater error codes, voltage levels and energy storage, pilot burner status, failures and relights, water temperature and capacity, and sediment buildup (water temperature rise rate changes) as indicated in symbol 85.

WiFi or other wireless mechanism may utilize a communication algorithm 83 if WiFi or other such mechanism is incorporated as indicated in symbol 75. If incorporating WiFi or other wireless mechanism, a data gathering algorithm may be used. At symbol 86, data as needed may be gathered and saved to support an operation and diagnostics, such as everything in a message alert and error handling list. Water draw and gas burn history may be gathered and saved. At symbol 77, the pilot may be relit according to an algorithm 84. After symbol 77, the flow of activity may be repeated from symbols 72 through 77.

Figure 5B:
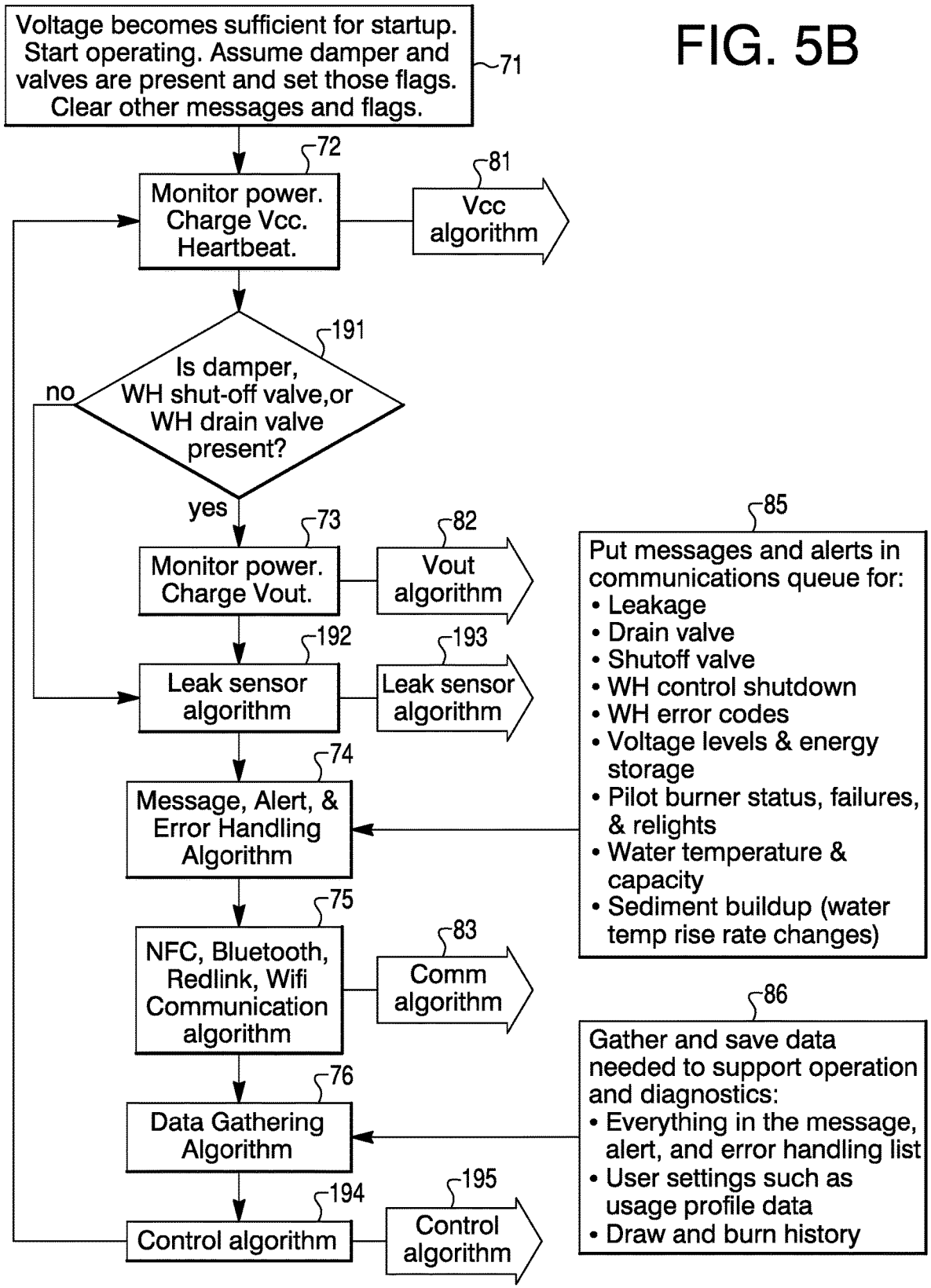
FIG. 5b may be similar to FIG. 5a but may incorporate some other features.

FIG. 5b may be similar to FIG. 5a but may further incorporate a symbol 191 connected to symbol 72 and symbol 73 that asks a question whether a damper, water heater shut-off valve, or drain valve is present. If an answer is yes, then one may go to symbol 73 and then from symbol 73 to a symbol 192 for a leak sensor algorithm. If the answer is no to the question in symbol 191, then one may go directly to symbol 192 and leak sensor algorithm 193. From symbol 192, one may go to symbol 74. Information from block 85 to symbol 74 may further incorporate that of leakage, a drain valve and a shut-off valve. Information from block 86 to symbol 76 may further incorporate user settings such as usage profile data.

After symbol 76, a symbol 194 for a control algorithm may be placed in lieu of a pilot relight algorithm at symbol 77 and symbol 84. Control algorithm may be indicated by symbol 195. From symbol 194, one may go to symbol 72.

Figure 6A:
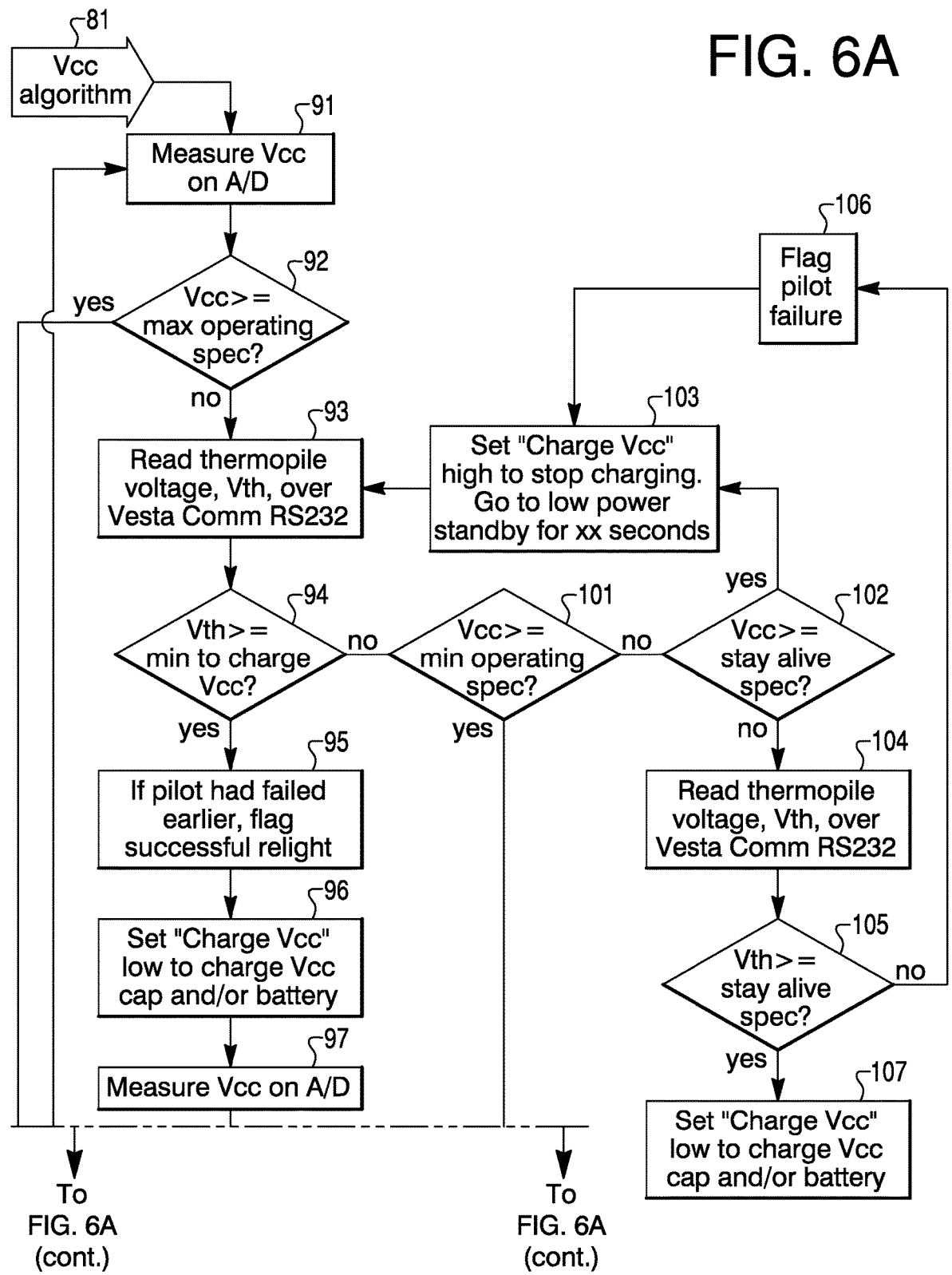
FIG. 6a is a flow diagram for a voltage algorithm.
Figure 6A:
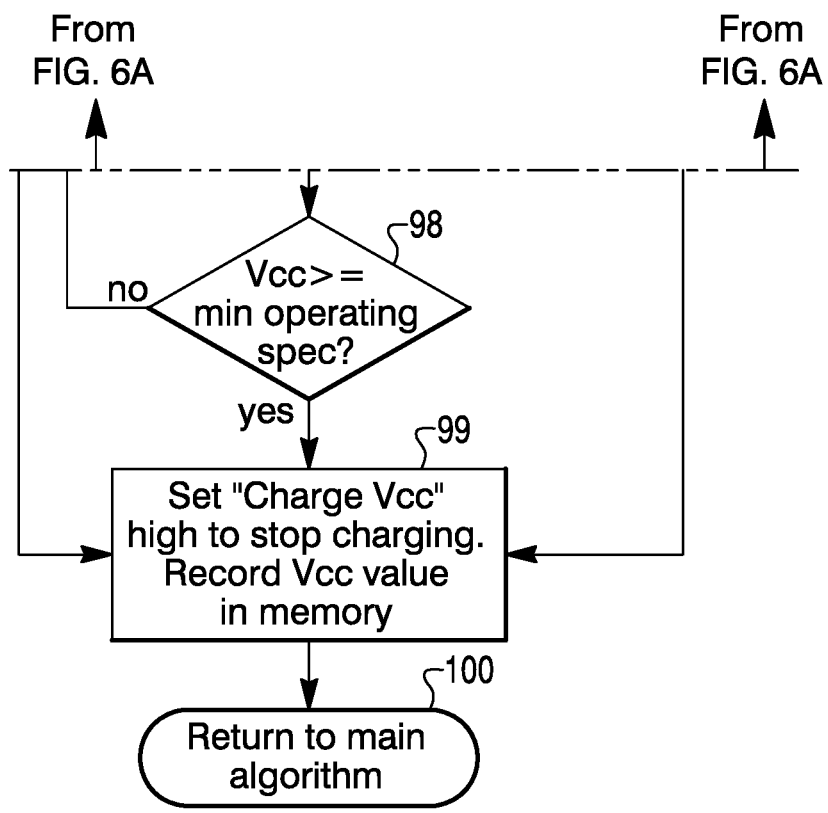

FIG. 6a is a flow diagram for Vcc algorithm 81. At symbol 91, Vcc may be measured on an A/D line. A question at symbol 92 may be whether Vcc is greater than or equal to the maximum operating spec. If the answer is yes, then on may go to symbol 99 where "Charge Vcc" is set to high to stop charging. The Vcc value may be recorded in a memory. Then at symbol 100, a return to the main algorithm may be performed.

If Vcc is not greater than or equal to the maximum operating spec, then a thermopile voltage, Vth, may be read over (Vesta) communication RS232 at symbol 93. A question of whether Vth is greater than or equal to the charge Vcc may be asked at symbol 94. If the answer is yes, and then the pilot had failed earlier, then a successful relight may be flagged at symbol 95. At symbol 96, "Charge Vcc" may be set low to charge the Vcc capacitor and/or a battery. Then Vcc may be measured on A/D at symbol 97. A question of whether Vcc is greater than or equal to a minimum operating spec may be asked at symbol 98. If the answer is yes then "Charge Vcc" may be set to "high" to stop the charging. Also, the Vcc value may be recorded in a memory according to symbol 99. After symbol 99, a return may be made to the main algorithm as indicated in symbol 100.

If the answer is no to the question in symbol 98, then a return to symbol 91 may be made and the items at symbols 91-98 may be repeated with an answer to the questions at symbols 92 and 94 being no and yes, respectively. The question at symbol 98 may be answered as no. Then a question at symbol 101 may be whether Vcc is greater than or equal to a minimum operating spec. If the answer is yes, then "Charge Vcc" may be set to "high" to stop charging. The Vcc value may be recorded in the memory. A return to the main algorithm may occur at symbol 100.

If the answer is no to the question in symbol 101, then a question in symbol 102 whether Vcc is greater than or equal to a stay alive spec may be asked. If the answer is yes, then at symbol 103, "Charge Vcc" may be set high to stop the charging. Low power standby for xx seconds may occur. Then the sequence may continue from symbol 93 as noted herein.

If the answer to the question at symbol 102 is no, then at symbol 104, the thermopile voltage, Vth, may be read over a (Vesta) communications RS232. At symbol 105, a question of whether Vth is greater than or equal to than the stay alive spec may be asked. If the answer is no, then pilot failure may be flagged at symbol 106, and a return to symbol 103 may be made. The sequence from symbol 103 may occur as indicated herein.

If the answer at symbol 105 is yes, then "Charge Vcc" may be set to "low" to charge the Vcc capacitor and/or battery as indicated at symbol 107. Then a return to symbol 104 may occur and the sequence there may continue as indicated herein. The stay alive voltages should be somewhat above the voltages that will kill the controller in order to allow the algorithm to continue. The voltages may be a minimum voltage needed to stay alive plus run the algorithm.

Figure 6B:
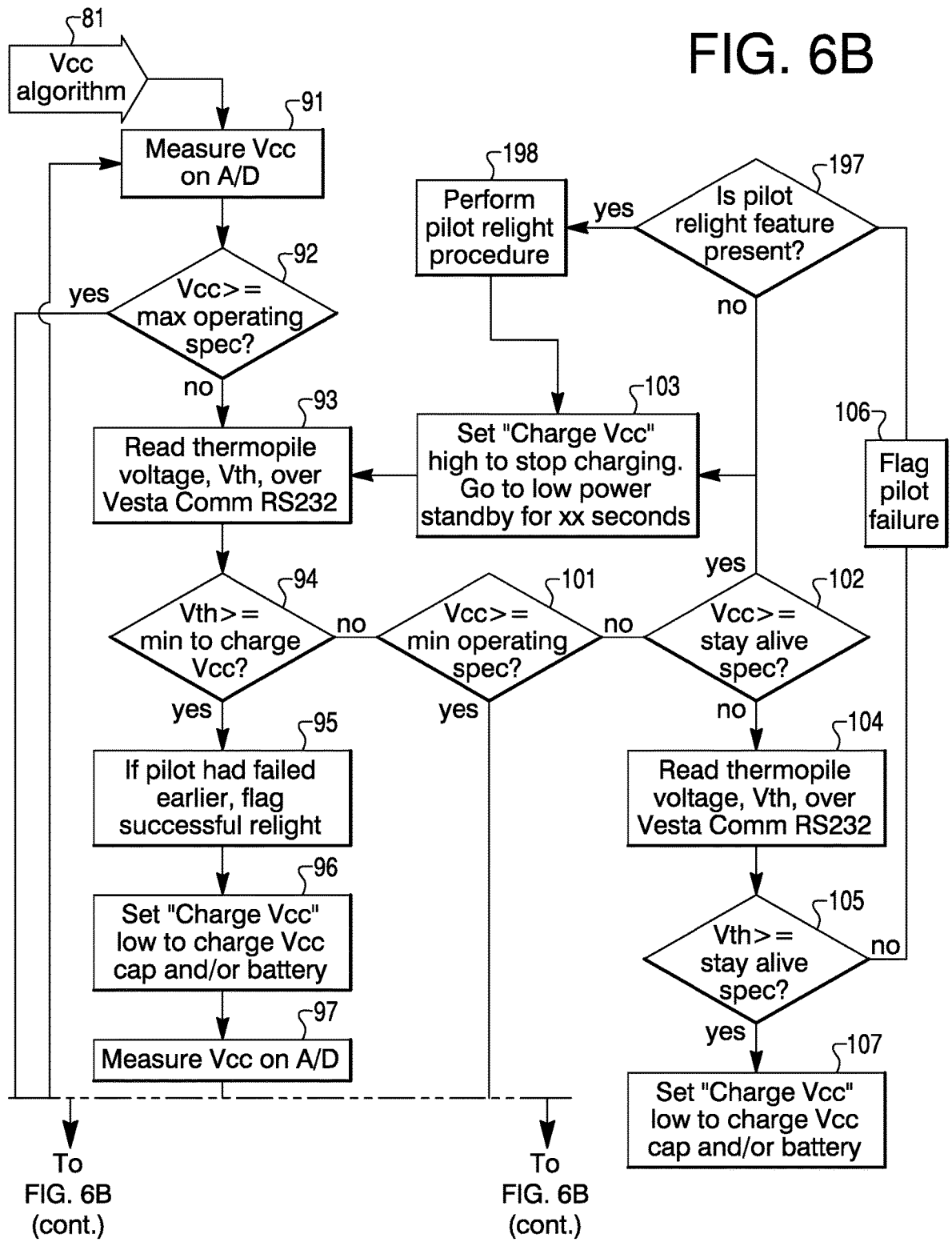
FIG. 6b may be similar to FIG. 6a for the voltage algorithm but may further incorporate some other features.
Figure 6B:
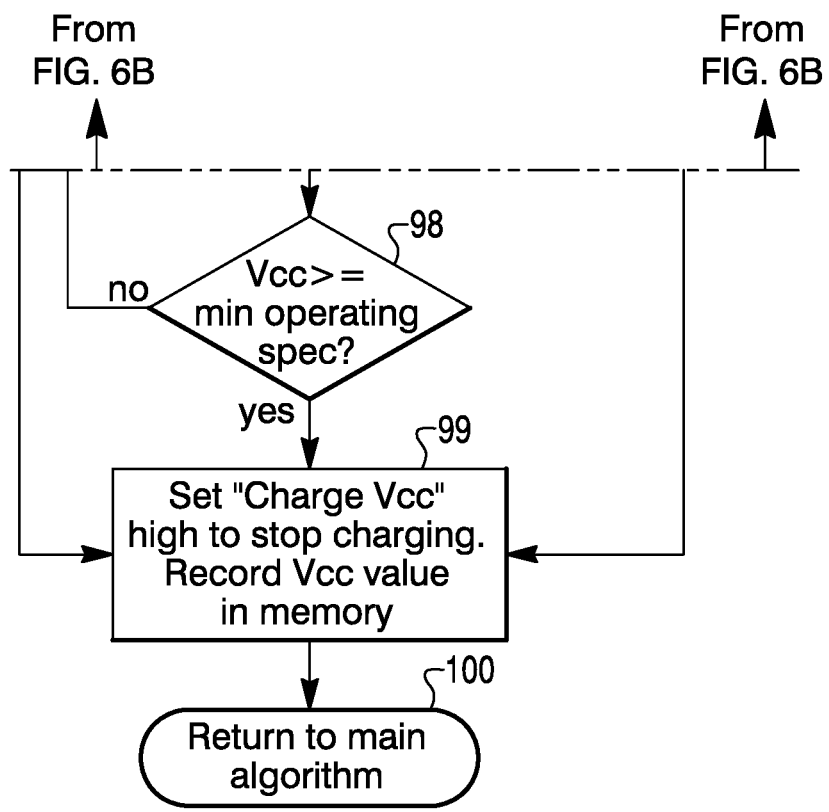

FIG. 6b may be similar to FIG. 6a for Vcc algorithm 81 but may further incorporate symbol 197 and symbol 198 in lieu of a direct connection from symbol 106. From symbol 106, one may go to symbol 197 that asks a question whether a pilot relight feature is present. If answer is no, then one may go to symbol 103. If the answer is yes, then one may go to symbol 198 that indicates a pilot relight procedure is to be performed. After symbol 198, one may go to symbol 103.

Figure 7:
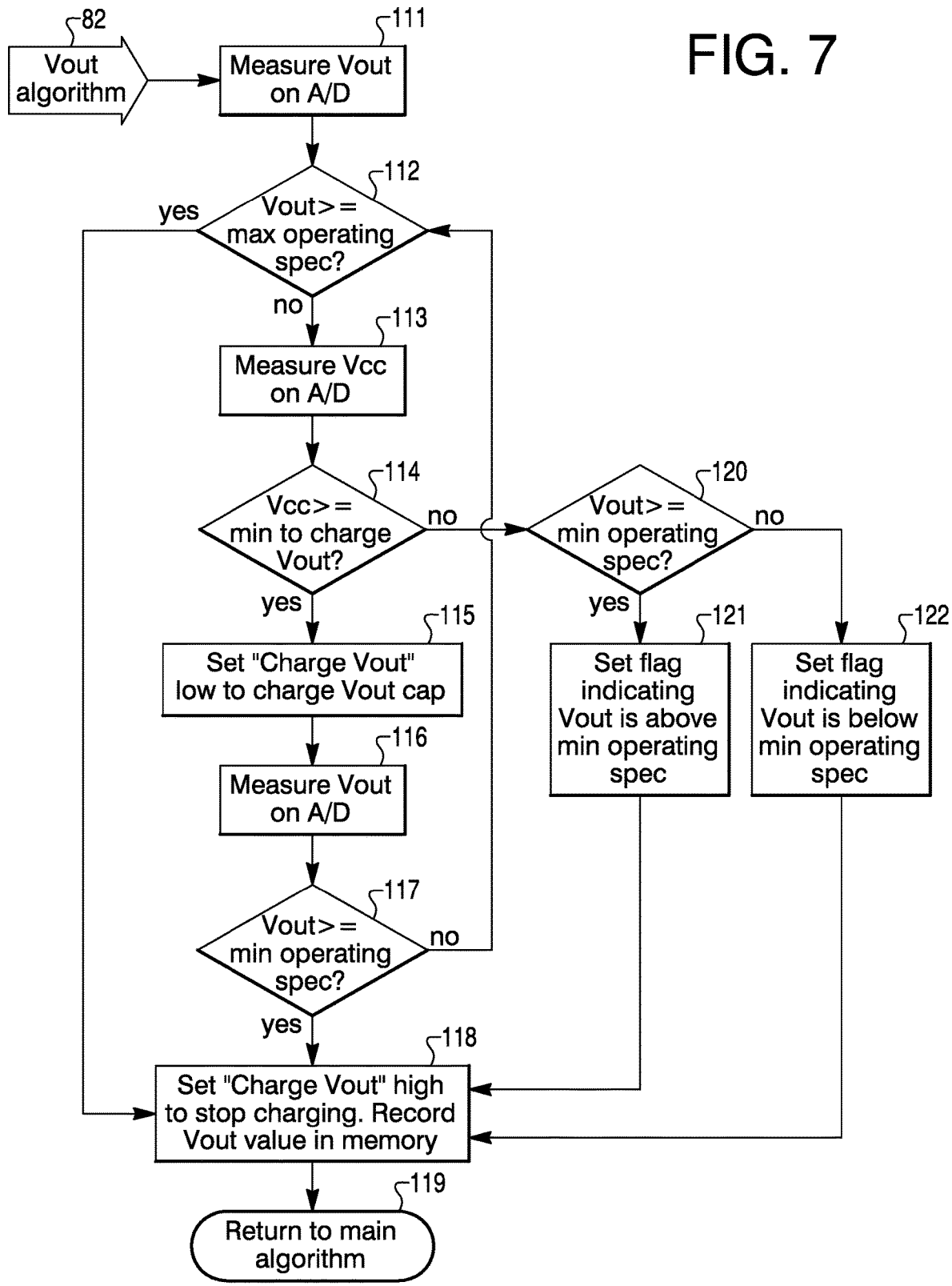
FIG. 7 is a flow diagram of another voltage algorithm.

A Vout algorithm 82 of FIG. 7 may begin at symbol 111 where a Vout on A/D may be measured. At symbol 112, a question of whether Vout is greater than or equal to the maximum operating spec may be asked. If the answer is yes, then at symbol 118, "Charge Vout" may be set to "high" to stop charging. The Vout value may be recorded in the memory, and a return to the main algorithm may occur at symbol 119.

If the answer to the question at symbol 112 is no, then Vcc may be measured on the A/D at symbol 113. A question of whether Vcc is greater than or equal to a minimum to charge Vout may be asked at symbol 114. If the answer is yes, then symbol 115 "Charge Vout" may be set to "low" to charge the Vout capacitor. Then Vout on the A/D may be measured at symbol 116. At symbol 117, a question of whether Vout is greater than or equal to the minimum operating spec may be asked. If the answer is yes, then the "Charge Vout" may be set to "high" to stop the charging, at symbol 118. Vout may be recorded in the memory. A return may then be made at symbol 119 to return to the main algorithm.

If the answer is no to the question at symbol 117, then a return may be made to symbol 112 where the question of whether Vout is greater than or equal to the maximum operating spec. The sequence after symbol 112 may followed as indicated herein.

If the answer to the question at symbol 114 is no, then a question of whether Vout is greater than or equal to the operating spec may be asked at symbol 120. If the answer is yes, then a flag may be set indicating that Vout is above the minimum operating spec according to symbol 121. Then at symbol 118, "Charge Vout" may be set to "high" to stop the charging. The Vout value may be recorded in the memory. If the answer is no, then a flag may be set indicating that Vout is below the minimum operating spec according to symbol 122. Then at symbol 118, the activity as indicated herein may occur.

Figure 8:
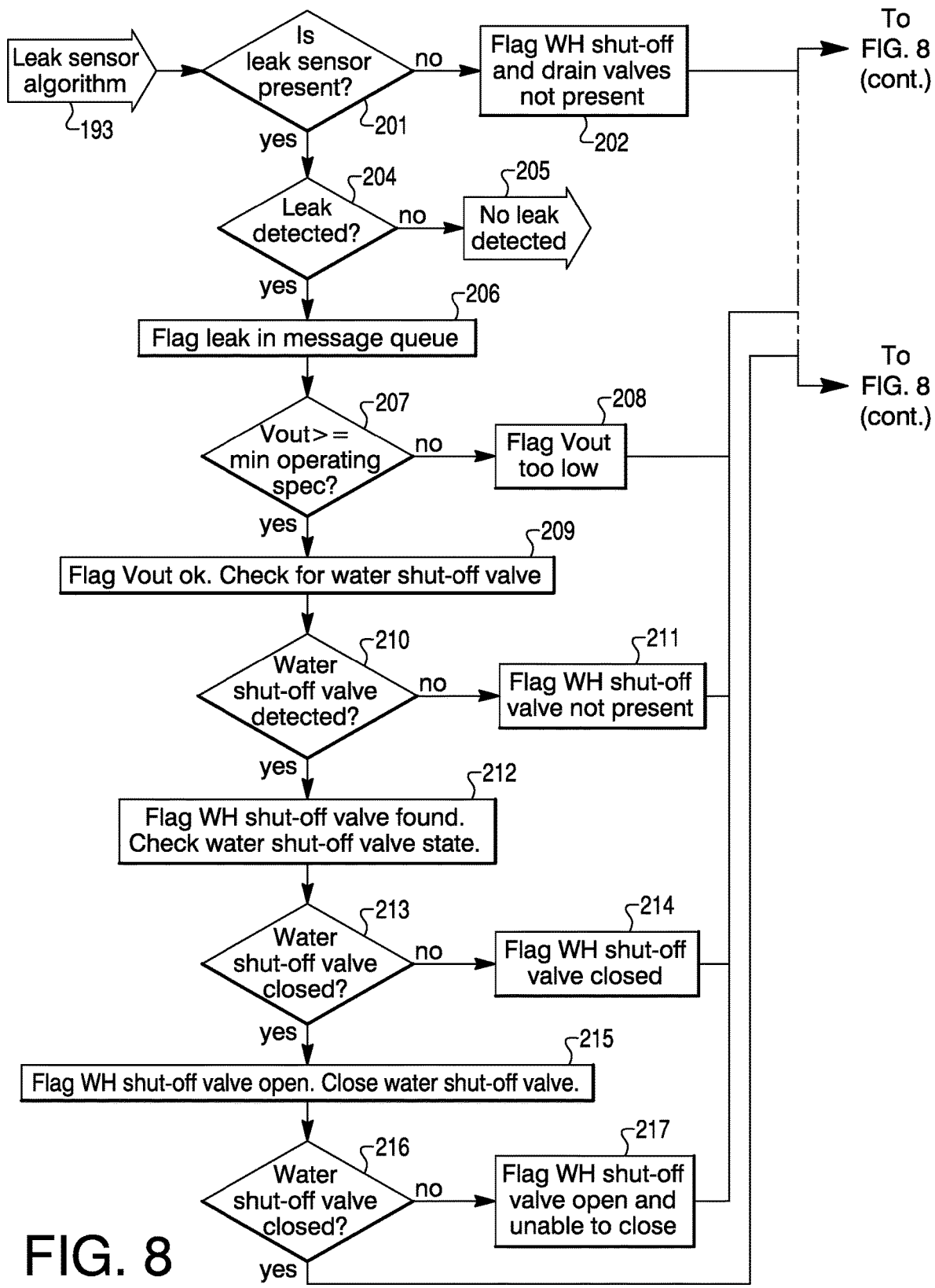
FIG. 8 is a flow diagram of leak sensor algorithm.

FIG. 8 is a flow diagram of leak sensor algorithm 193 that may start out with a symbol 201 asking a question whether a leak sensor is present. If not, then water heater shut-off and drain valves are flagged as not present according to symbol 202, and a return to a main algorithm may be made at symbol 203. If the answer at symbol 201 is yes, then a question of whether a leak is detected may be asked at symbol 204. If an answer is no, then no leak detected may be indicated at symbol 205. If the answer is yes, then the leak may be flagged in a message queue at symbol 206. After symbol 206, a question whether Vout>=minimum operating spec may be asked at symbol 207. If an answer is no, then flag Vout may be too low at symbol 208 and then a return to the main algorithm may be made as indicated by symbol 203.

If the answer to the question at symbol 207 is yes, then the flag Vout may be fine and the water shut-off valve may be checked for at symbol 209. A question of whether the water shut-off valve was detected may be asked at symbol 210. If an answer is no, then the water heater shut-off valve may be flagged at symbol 211 as not being present. After symbol 211, a return to the main algorithm may be made at symbol 203.

If the answer to the question at symbol 210 is yes, then at symbol 212, the water heater shut-off valve may be found and its state be checked. At symbol 213, a question of whether the water heater shut-off valve is closed may be asked. If an answer is yes, then the closure of the water heater valve may be flagged at symbol 214 after which a return to the main algorithm may be made as indicated by symbol 203. If the answer is no, then the water heater valve may be flagged as open and the valve may be closed at symbol 215. At symbol 216, a question of whether the shut-off valve is closed may be asked. If an answer is no, then the shut-off valve may be flagged as open and unable to be closed. Then at symbol 203, a return to the main algorithm may be made.

If the answer is yes to the question at symbol 216, then a question of whether Vout>=minimum operating spec may be asked. If an answer is no, then Vout as too low may be flagged at symbol 219 and a return to the main algorithm may be made according to symbol 203.

If the answer to the question at symbol 218 is yes, then Vout may be flagged as ok and the water heater drain valve may be checked at symbol 220. At symbol 221, a question of whether the water heater drain valve can be detected may be asked. If an answer is no, then the drain valve may be flagged as not being present at symbol 222 and a return to the main algorithm may be made as indicated at symbol 203. If the answer to the question is yes, then that the drain valve was found and the drain valve state is checked may be indicated at symbol 223.

At symbol 224, a question of whether the water heater drain valve is open may be asked at symbol 224. If an answer is yes, then that the drain valve is open may be flagged at symbol 225 and a return to the main algorithm may be made according to symbol 203. If the answer is no, then that the drain valve is closed may be flagged and the drain valve may be opened at symbol 226.

At symbol 227, a question of whether the drain valve is open may be asked. If an answer is no, then that the drain valve is closed and unable to be opened may be flagged at symbol 228, and a return to the main algorithm may be made as indicated at symbol 203. If the answer is yes, then a return to the main algorithm may occur according to symbol 203.

Figure 9:
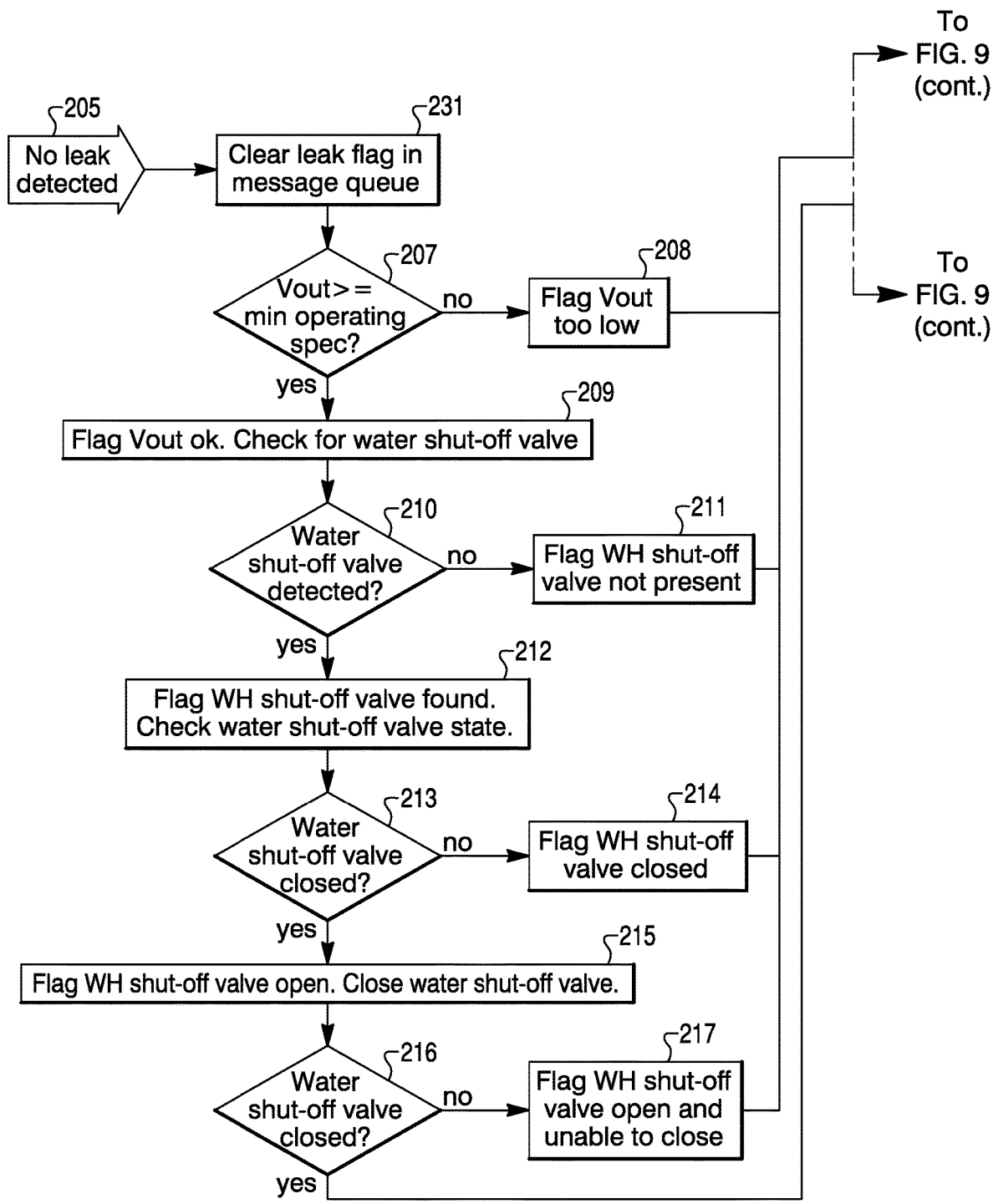
FIG. 9 is a flow diagram of a no leak detected algorithm.
Figure 9:
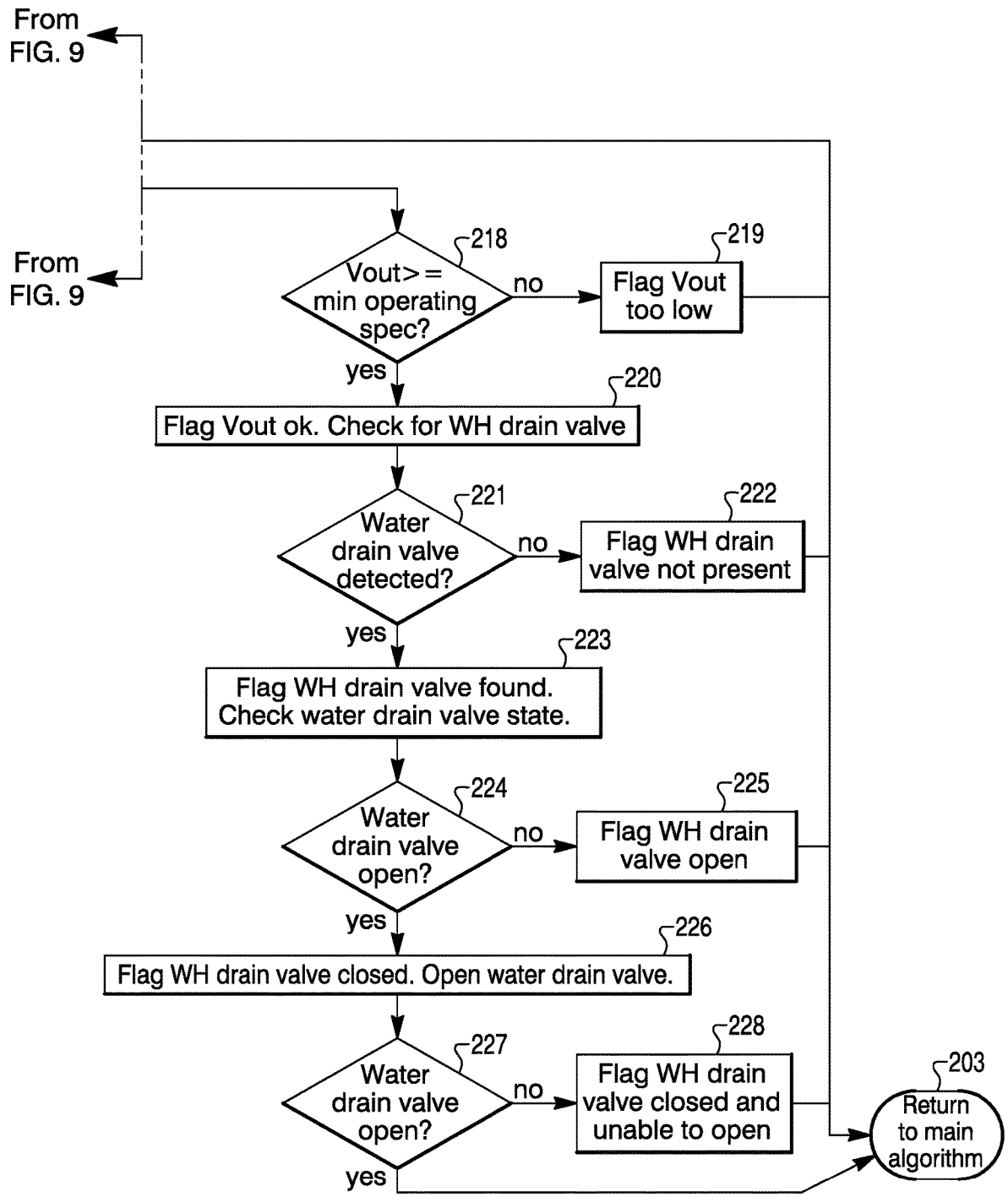

FIG. 9 is a flow diagram of a no leak detected algorithm of symbol 205. A clear leak flag in a message may be indicated in symbol 231. At symbol 207, a question of whether Vout>=minimum operating spec may be asked. For symbols 208 through 228 and including symbol 203, the items, steps and/or actions represented by these symbols are indicated in a description of the flow diagram in FIG. 8.

Figure 10:
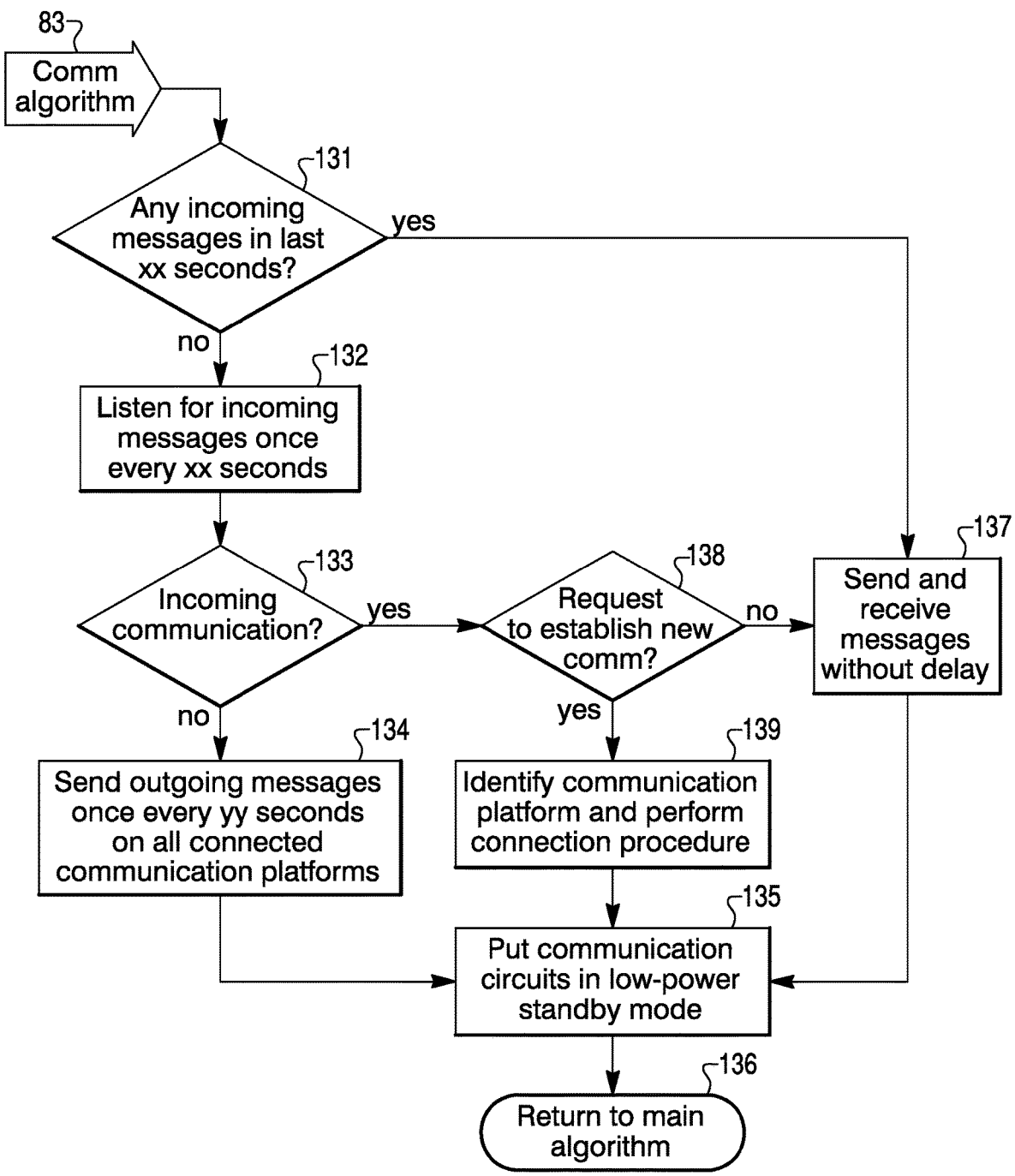
FIG. 10 is a flow diagram of a communications algorithm.

The communications algorithm 83 of FIG. 10 may begin with a question at symbol 131 whether there were any incoming messages in the last xx seconds. If the answer is no, then at symbol 132 incoming messages may be listened for once every xx seconds. A question may be asked at symbol 133 as to whether there is an incoming communication. If the answer is no, then outgoing messages may be sent every yy seconds at symbol 134 on all connected communication platforms. At symbol 135, communication circuits may be put in a low-power standby mode. Then a return at symbol 136 may be made to the main algorithm. "xx" and "yy" may indicate predetermined periods of time. A point of the algorithm may be to check for and send messages periodically at some time interval that will be conveniently short to users but long enough to minimize power consumption.

If the answer to the question at symbol 131 is yes, then messages may be sent and received without delay at symbol 137. Afterwards, communication circuits may be put in low power standby mode in symbol 135 and a return may be made to the main algorithm according to symbol 136.

If the answer to the question at symbol 133 is yes, then a question of whether there is a request to establish a communication may be asked at symbol 138. If the answer to the question at symbol 138 is no, then messages may be sent and received without delay at symbol 137. The sequence of activity that follows symbol 137 may be indicated herein.

If the answer to the question at symbol 138 is yes, then a communication platform may be identified and a connection procedure may be performed as indicated at symbol 139. The sequence of activity after symbol 139 noted at symbol 135 may be indicated herein.

Other than for a setup, messages may be generally outgoing only, so wait time is not necessarily a major issue. Thus, messages may be sent at a relatively long time interval in contrast to an average interval without an issue. The point of the algorithm may be to check for and send messages periodically at some time interval that will be conveniently short to users but long enough to minimize power consumption.

Figure 11:
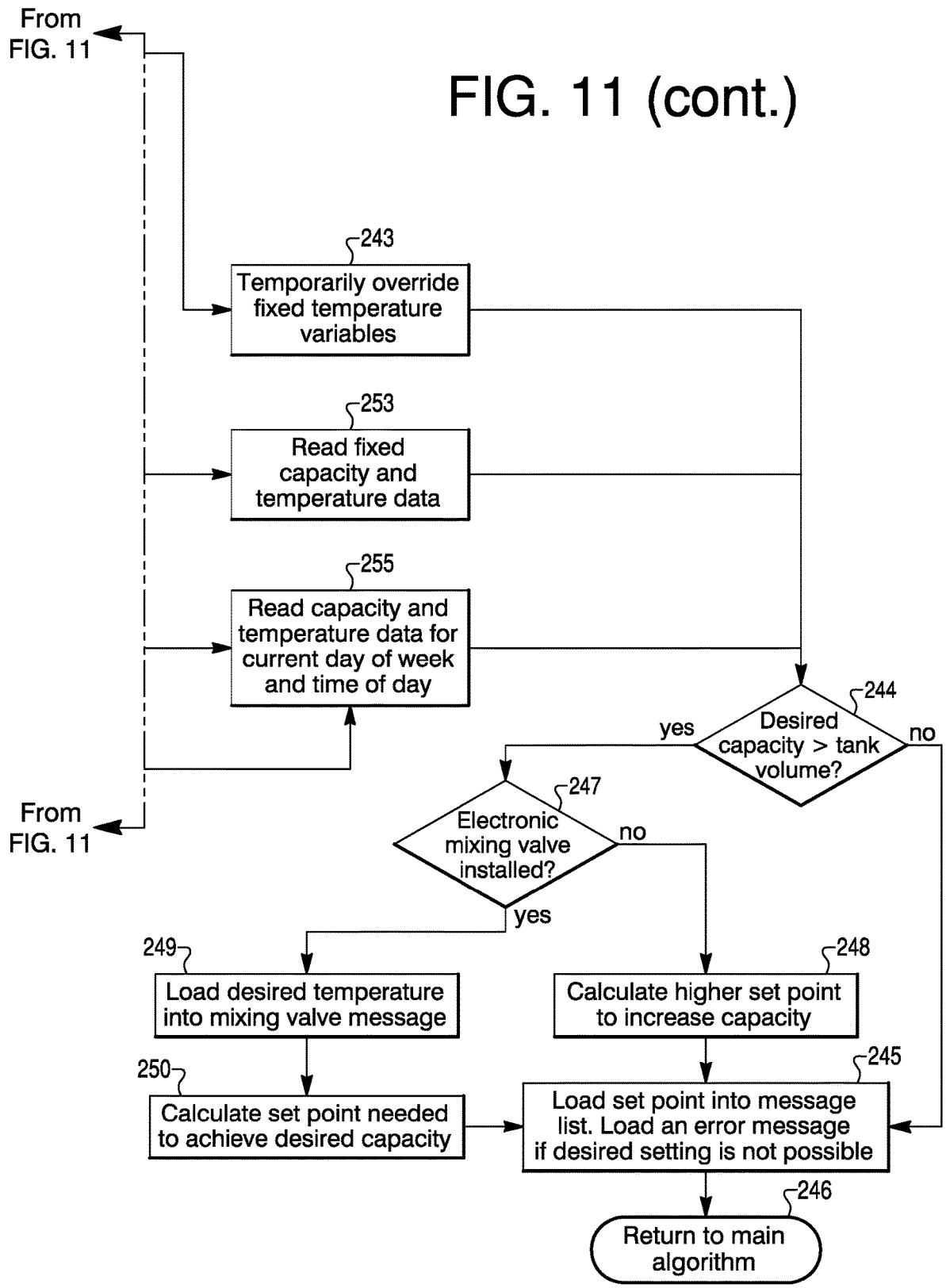
FIG. 11 is a flow diagram of a control algorithm.

FIG. 11 is a flow diagram of a control algorithm 195 where a mode from a user interface may be obtained as indicated in symbol 241. In symbol 242, a question of whether there is a temporary override may be asked. If an answer is yes, then fixed temperatures may be temporarily overridden at symbol 243. At symbol 244, a question of whether desired capacity >tank volume may be asked. If an answer is no, then a set point may be loaded into a message list, and an error message may be loaded if a desired setting is not possible according to symbol 245. After symbol 245, a return to the main algorithm may occur at symbol 246.

If the answer of the question at symbol 244 is yes, then a question at symbol 247 of whether an electronic mixing valve is installed may be asked. If an answer is no, then a higher set point to increase capacity may be calculated. Then at symbol 245, the set point may be loaded into a message list, and an error message may be loaded if a desired setting is not possible according to symbol 245. After symbol 245, a return to the main algorithm may occur according to symbol 246.

If the answer to the question at symbol 247 is yes, then a desired temperature may be loaded into a mixing valve message at symbol 249. Then a set point needed to achieve a desired capacity may be calculated according to symbol 250. The set point may be loaded into the message list, or an error message may be loaded if a desired setting is not possible. Then a return to the main algorithm may occur at symbol 246.

If the answer to the question at symbol 242 is no, then a question of whether there is a temporary boost mode may be asked at symbol 251. If an answer is no, then a question of whether there is a fixed temperature mode may be asked. If an answer is yes, then at symbol 253, a fixed capacity and temperature data may be read. Subsequent to symbol 253, items of symbols 244 through 250 may occur.

If the answer to the question at symbol 252 is no, then a question of whether there is a fixed usage profile mode may be asked at symbol 254. If an answer is yes, then capacity and temperature data for a current day of a week and time of day may be read at symbol 255. Subsequent to symbol 255, items of symbols 244 through 250 may occur.

If the answer to the question at symbol 254 is no, then learning variables for a learning algorithm may be read according to symbol 256 and stored usage history data may be read at symbol 257. A question of whether there is enough data or new data to update a calculation may be asked at symbol 258. If an answer is no, then items of symbols 255, and 244 through 250 may occur. If the answer is yes to the question of symbol 258, then a new usage profile based on input variables and history data may be calculated. Then items of symbols 255, and 244 through 250 may occur.

If the answer to the question at symbol 251 is yes, then a question of whether the boost mode has expired may be asked at symbol 260. If an answer is yes, then the boost mode may be cleared and the fixed mode or usage profile variables may be restored according to symbol 261. Subsequent to symbol 261, items of symbols 252, 253, and 244 through 250 may occur.

If the answer to the question at symbol 260 is no, then a question of whether a fixed temperature mode is boosted may be asked at symbol 262. If an answer is yes, then a question of how much boost may be asked and fixed temperature variables may be temporarily overridden. Subsequent to symbol 263, items of symbols 252, 253, and 244 through 250 may occur.

If the answer to the question at symbol 262 is no, then a question of whether to boost a fixed usage profile mode may be asked at symbol 264. If an answer is yes, then a question of how much boost may be asked and fixed usage profile variables may be temporarily overridden at symbol 265. Subsequent to symbol 265, items of symbols 254, 255, 244 through 250, and 256 through 259 may occur.

If the answer to the question at symbol 264 is no, then a question of how much boost may be asked and learning usage profile variables may be temporarily overridden at symbol 266. Subsequent to symbol 266, items at symbols 257 through 259, 255, and 244 through 250 may occur.

Figure 12:
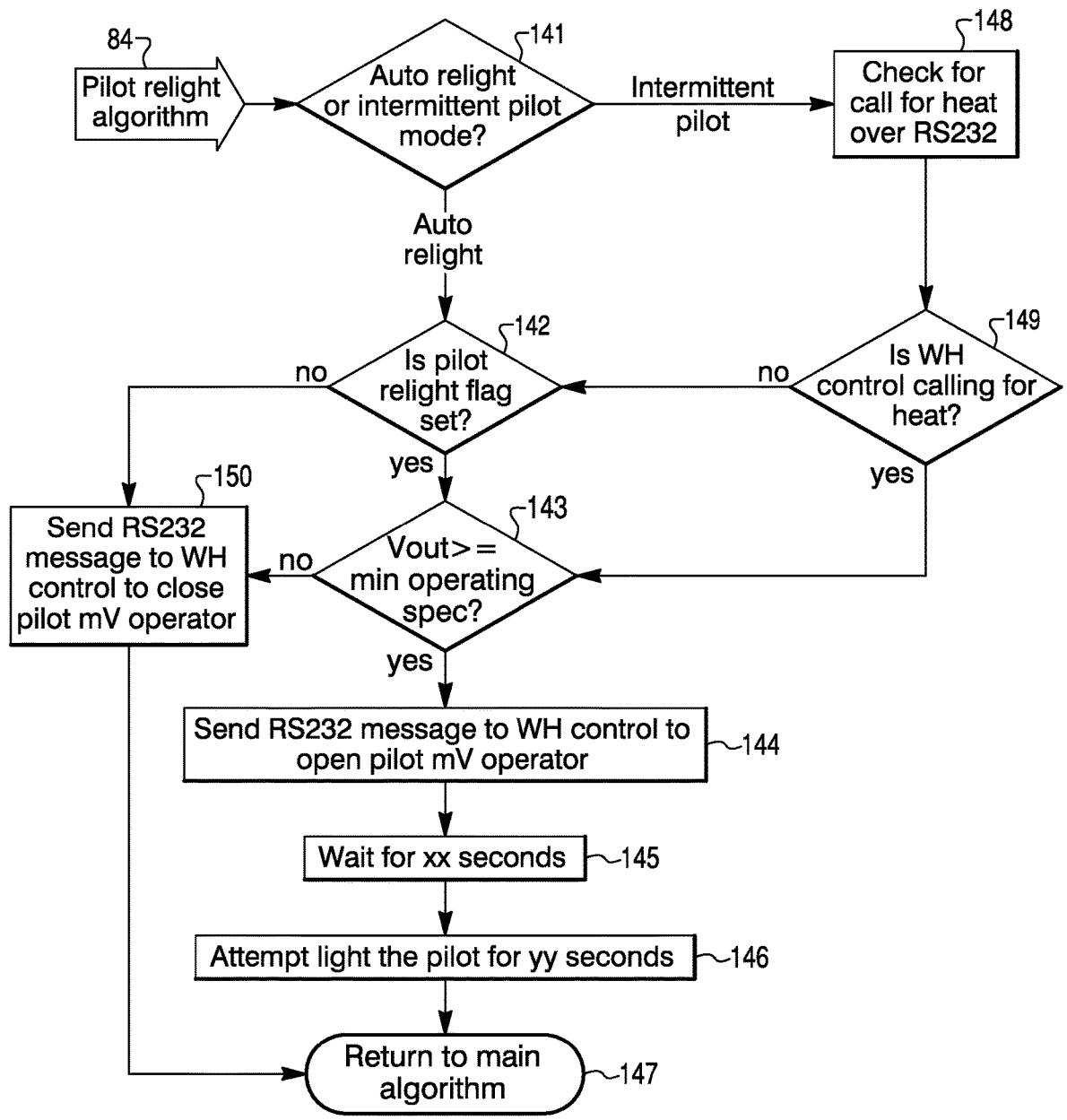
FIG. 12 is a flow diagram of a pilot relight algorithm.

The pilot relight algorithm 84 of FIG. 12 may begin at symbol 141 where a question of whether there is an auto relight or intermittent pilot mode. If the mode is auto relight, then a question whether a pilot relight is set or not set may be asked at symbol 142. If the answer is yes, then a question of whether Vout is greater than or equal to a minimum operating voltage as indicated in symbol 143. If the answer is yes, then a RS232 message may be sent to a water heater control to open a pilot mV operator as indicated by symbol 144. A response to the message may be waited for, for xx seconds at symbol 145. An attempt to light the pilot may occur for yy seconds at symbol 146. Then at symbol 147, a return to the main algorithm may occur.

If an answer to the question in symbol 141 is an intermittent pilot, then a check for a call for heat over the RS232 may be made at symbol 148. A question whether the water heater control is calling for heat over the RS232 may be asked at symbol 149. If an answer to the question is no, then the question at symbol 142 whether the pilot relight flag is set may be asked. If the answer is no, then an RS232 message may be sent to the water heater control to close the pilot mV operator at a symbol 150. After symbol 150, a return to the main algorithm may be made according to symbol 147.

If the answer to the question in symbol 149 is yes, then the question of whether Vout is greater than or equal to a minimum operating spec may be asked at symbol 143. The activity sequence for the yes and no answers relative to the question at symbol 143 may be indicated herein.

Additional items may be noted. In a usage mode setup, there may be setup screens for boost, manual override, vacation, fixed temperature, fixed usage pattern, and learning usage pattern operating modes. One may show an estimated energy and money savings based on the usage mode setup. Options may include detection of whether people are home and make hot water available. There may be an option to stay in a standby mode if no one is home. One may work off phones, Wi-Fi activity, connected home information, and so forth. There may be an option to have a specified amount of extra hot water available beyond what the usage profile determines is needed. If the pilot relight feature is included in a module, one may choose automatic pilot relight or intermittent pilot.

In a system setup, an application may include setup instructions, links to help, videos, and so on. There may be a setup screen for a communication arrangement.

There may be setup screens for appliance data. They may include options to select a water heater model, dish washer model and clothes washer model. An option may allow one to manually enter the data or to estimate the data. Data options may include fuel type, fuel cost, BTU/hr, WH gallon capacity, how much water dish washer or clothes washer consume, shower head flow rate, and so forth. Energy/money saving suggestions and options may allow one to easily or automatically change the setup or user profile based on suggestions. If electronic mixing valve is present, the user may be shown the capacity increase that is available as a function of temperature. There may be a setup for integration into any connected home/smart home systems.

A message and alert setup may have a setup screen for users to select what message and alerts they would like to receive and how they would like to receive them. There may be set up options to alert service providers. Possible messages may include any warnings, system errors, abnormal water usage, hot water capacity, leaks, pilot failures and relights, energy storage, energy and money savings from the usage profile vs having a fixed temperature, and so on.

The phone or computer app may contain most of the data analysis or processor intensive calculations. The device on the water heater may do only what is necessary for its normal operation. Data analysis may be done in the phone or computer using data gathered and logged in the device mounted on the water heater. Results may be stored in a cloud location.

Usage profiles may include setting minimum water temperatures for the times when hot water is not needed. Usage profiles may be broken down into convenient time intervals such as 30 minutes or user definable blocks of time. Before any usage history is collected, the starting point may be a fixed usage profile or a fixed temp, depending on what the user enters. The nature of statistics may change the results/accuracy of the learned usage profile based on the amount of data available. One may calculate the times, temperature, and capacity needed to a specified confidence level based on max temperature desired, burn times, and max water temp rise rate or BTU rate.

For learned usage profiles, more confidence may increase hot water schedule and cost. Less confidence may reduce hot water schedule and cost. One may include capability to heat using the pilot if there's a long time between times when hot water is needed.

Water heater Vcc (thermopile) may be monitored to detect if pilot goes out. A message may be sent out to the user which includes information on how much hot water is available. A periodic RS232 comm may be sent out to ensure control is still alive.

A pilot function may incorporate an intermittent pilot, or relight the pilot, and an option to keep the water heater control alive if the pilot goes out. It may be kept alive by applying Vcc back through RS232. A relight may include an intermittent pilot circuit in the control and plug the spark rod into the control and the piezo into the control. This may open the pilot valve by repowering the Vesta control and commanding the pilot open through comms. If the automatic relight fails, one may still use the piezo. The function may be in a stand-alone device that does not offer any comms, or be included in the present device.

There may be a learning algorithm option which would set a confidence level of having hot water vs energy savings. An option may result in hot water being available whenever the furnace thermostat is set for when people are home. One may heat water with the pilot when there is a long time between demand periods.

An option may be included for staying in a standby mode if no one is home. One may work off phones, Wi-Fi activity, connected home info, and so forth. Control of an electronic mixing valve may be included. The set point may be put to the lowest possible temperature to meet demand. A temperature profile may be monitored during burn to identify problems such as sediment buildup. Any controller error codes may be checked and the user may be alerted of any.

Learning software that saves energy may include software that automatically adjusts water heater temperature based on usage patterns. There may be daily, weekly, monthly, yearly (selectable) updates of energy consumption. There may be customizable alarms and alerts regarding energy consumption.

Errors and alerts may be in plain English, including troubleshooting tips, and recommended actions (excluding water heater leaks). There may be water heater leak alerts and alarms. There may be remote adjustment of water temperature, and enter and exit vacation modes. One may view available hot water. There may be a temporary boost mode for a longer supply of hot water. Paid remote monitoring by service provider/3rd party for quick service and problem resolution may be made available.

Symbols such as H, X, Y, xx, yy, and the like, may represent certain numerical values that might be predetermined.

To recap, a communication mechanism may incorporate a smart device, and a control device connected to an appliance. Control of the appliance may be effected with signals between the smart device and the control device. The control device may incorporate optimization software for the appliance. A basis for power for the appliance may be selected from a group consisting of electricity, natural gas, propane, oil, kerosene, coal, and wood. The optimization software may incorporate one or more items selected from a group consisting of reduced operating costs of the appliance, usage pattern based optimization, prognostics for performance over time, maintenance alarms, performance optimization alerts, and demand response management for load shedding. The appliance may be a water heater.

The control device may incorporate a communication module that is powered by a source selected from a group consisting of a battery, a capacitor, a line power outlet, appliance control power outlet, solar cell, and a flame/heat/thermo cell. The appliance may be powered by one or more sources selected from a group consisting of a line power outlet, thermopiles, solar panels, wind generators, rechargeable batteries, and energy harvesting systems.

A smart device may be selected from a group consisting of a Kindle™, Ipad™, PC, laptop, notebook, tablet, PDA, Wi-Fi™ router, and smart phone.

The control device may have a wireless connection with the appliance, or the control device may a wire connection with the appliance.

The control device may be embedded in a control unit of the appliance.

The smart device may control two or more appliances with two or more control devices connected to the two or more appliances, respectively.

Set points of the appliance may be changeable with the smart device via the control device.

The control module may interface with a thermostat to perform a function with the smart device, control a set point of the appliance, to read a home heating and cooling schedule on another smart device and apply the home heating and cooling schedule to an appliance usage profile.

The smart device may read settings of a thermostat and settings of the appliance that impact hot water demand, and apply the settings to a schedule and usage profile of the appliance.

The mechanism may further incorporate a control knob for selecting a level amount of hot water demand or temperature of hot water.

The mechanism may further incorporate one or more accessories connected to the appliance. The one or more accessories may have communications for one or more items selected from a group consisting of water shutoff valves, fuel valves, stand alone MMI, and power switches. The communications may be effected by one or more items selected from a group consisting of relay outputs, transistor outputs, RF outputs and light outputs.

An approach for controlling a water heater may incorporate creating a periodic water usage profile from water usage and temperature data from a water heater with a profiling program, loading the periodic water usage profile to a control for a water heater, selecting a mode of demand, at the control for the water heater, for a certain amount of water within a particular temperature range to be available for use from the water heater, creating a learning program having an enablement option for an update of the periodic water usage profile, water temperature and mode of demand for water from the water heater, and loading the update of the periodic water usage profile, water temperature and mode of demand for water to the control for the water heater device. A basis for power for the water heater may be selected from a group consisting of electricity, natural gas, propane, oil, kerosene, coal, and wood.

If the enablement option of the learning program is engaged, then a monitoring of water usage, temperature and demand for water from the water heater may occur for X days. An update of the periodic water usage profile, water temperature and mode of demand for water based on the monitoring for X days may be loaded to the control for the water heater device.

If an enablement option of learning program is not engaged, then the water heater may operate according to a predetermined program for one or more items selected from a group consisting of water usage and water temperature.

The approach may further incorporate collecting data related to water usage, temperature and demand, and calculating statistics for usage, demand and adjustment over time.

A daily usage profile and margin of error may be determined and updated. A weekly usage routine for day by day usage pattern may be determined and updated. More usage may increase a confidence level in the daily usage profile and weekly usage routine.

If the basis for power for the water heater is electricity, the water heater may benefit from a flexibility of having one, two or more heating elements being selected to be energized.

A communication system may incorporate a control device connected to an appliance, and a control knob. Control of the appliance may be effected with signals between control knob and the control device. The control device may incorporate optimization software for the appliance. A basis for power for the appliance may be selected from a group consisting of electricity, natural gas, propane, oil, kerosene, coal, and wood. The optimization software may incorporate one or more items selected from a group consisting of reduced operating costs of the appliance, usage pattern based optimization, prognostics for performance over time, maintenance alarms, performance optimization alerts, and demand response management for load shedding. The appliance may be a water heater.

A control knob may be used to select a magnitude of hot water demand or temperature of hot water. The demand may be based on one or more items selected from group consisting of usage patterns and user programmed patterns.

The system may further incorporate one or more accessories connected to the appliance. The one or more accessories may have communications for one or more items selected from a group consisting of water shutoff valves, fuel valves, stand-alone MMI, and power switches. The control device may incorporate a communication module that is powered by a source selected from a group consisting of a battery, a capacitor, a line power outlet, an appliance control power outlet, a solar cell, and a flame/heat/thermo cell. The appliance may be powered by one or more sources selected from a group consisting of a line power outlet, thermopiles, solar panels, wind generators, rechargeable batteries, and energy harvesting systems.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system comprising:
   a water heater configured to operate in a plurality of water demand modes; and
   a control device connected to the water heater,
   the system configured to:
     obtain a water usage profile;
     determine a set of temperature set points for the set of water demand modes based on the water usage profile, each water demand mode having at least one temperature set point;

obtain a selected water demand mode from the set of water demand modes from the water heater;

adjust a temperature of water in the water heater to a determined temperature set point of the set of temperature set points for the selected water demand mode; and update the set of temperature set points for the set of water demand modes based on a user input to the water usage profile and based on a monitored water usage pattern.

2. The system of claim 1, wherein:

the control device comprises a communication module that is powered by a battery, a capacitor, a line power outlet, an appliance control power outlet, a solar cell, or a flame/heat/thermo cell.

3. The system of claim 1, further comprising:

a smart device comprising one or more of an e-reader, a tablet computer, personal computer (PC), laptop, notebook, tablet, personal digital assistant (PDA), wireless router, or smart phone, wherein the smart device is configured to communicate with the control device.

4. The system of claim 1, wherein the control device has a wireless connection with the water heater.

5. The system of claim 1, wherein the control device has a wired connection with the water heater.

6. The system of claim 1, wherein the control device is embedded in a control unit of the water heater.

7. The system of claim 3, wherein the smart device is configured to control two or more appliances with two or more control devices connected to the two or more appliances, respectively.

8. The system of claim 3, wherein the set of temperature set points of the water heater are changeable with the smart device via the control device.

9. The system of claim 3, wherein the control device is configured to interface with a thermostat to perform a function with the smart device, control the set of temperature set points of the water heater, to read a home heating and cooling schedule on another smart device and apply the home heating and cooling schedule to a water heater usage profile.

10. The system of claim 3, wherein the smart device is configured to:

read settings of a thermostat;

read settings of the water heater that impact hot water demand; and apply the settings of the thermostat and the settings of the water heater to a schedule and the water usage profile of the water heater.

11. The system of claim 1, wherein the control device comprises a control knob for selecting a level amount of hot water demand or temperature of hot water.

12. The system of claim 1, further comprising:

one or more accessories connected to the water heater; and wherein the one or more accessories have communications for one or more items selected from a group consisting of water shutoff valves, fuel valves, stand alone man-machine interface (MMI), and power switches; and the communications are effected by one or more items selected from a group consisting of relay outputs, transistor outputs, RF outputs and light outputs.

13. A method for controlling a water heater configured to operate in a plurality of water demand modes, the method comprising:

loading a water usage profile to a control device connected to the water heater;

determining, by the control device, a set of temperature set points for the set of water demand modes based on the water usage profile, each water demand mode having at least one temperature set point;

obtaining, at the water heater, a selected water demand mode from the set of water demand modes;

adjusting a temperature of water in the water heater to a determined temperature set point of the set of temperature set points for the selected water demand mode; and updating, by the control device, the set of temperature set points for the set of water demand modes based on a user input to the water usage profile and based on a monitored water usage pattern.

* * * * *